US012707303B2

(12) United States Patent
Liu et al.

(10) Patent No.: US 12,707,303 B2
(45) Date of Patent: Aug. 11, 2026

(54) COMMUNICATION METHOD, APPARATUS, AND SYSTEM

(71) Applicant: Huawei Technologies Co., Ltd., Shenzhen (CN)

(72) Inventors: Nannan Liu, Beijing (CN); Junren Chang, Beijing (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 265 days.

(21) Appl. No.: 18/506,615

(22) Filed: Nov. 10, 2023

(65) Prior Publication Data

US 2024/0080691 A1 Mar. 7, 2024

Related U.S. Application Data

(63) Continuation of application No. PCT/CN2022/085150, filed on Apr. 2, 2022.

(30) Foreign Application Priority Data

May 10, 2021 (CN) ......................... 202110507117.9

(51) Int. Cl.
*H04W 24/08* (2009.01)
*H04W 72/40* (2023.01)

(52) U.S. Cl.
CPC ........... *H04W 24/08* (2013.01); *H04W 72/40* (2023.01)

(58) Field of Classification Search
None
See application file for complete search history.

(56) References Cited

U.S. PATENT DOCUMENTS

2020/0351707 A1 11/2020 Cheng
2021/0067277 A1 3/2021 Wu et al.
2021/0068187 A1 3/2021 Baghel et al.
2023/0189370 A1* 6/2023 Park ...................... H04W 76/18 370/329

FOREIGN PATENT DOCUMENTS

WO 2020197316 A1 10/2020

OTHER PUBLICATIONS

LG Electronics, "Discussion on physical layer procedures for NR sidelink," 3GPP TSG RAN WG1 Meeting #101, e-Meeting, May 25-Jun. 5, 2020, R1-2003566, 22 pages.
3GPP TSG RAN WG1 #102-e R1-2006181, Remaining Issues on Sidelink RLF, InterDigital, Inc., Aug. 17-8, 2020, total 2 pages.
3GPP TS 38.213 V16.5.0 (Mar. 2021), 3rd Generation Partnership Project; Technical Specification Group Radio Access Network; NR; Physical layer procedures for control (Release 16), total 183 pages.
3GPP TS 38.321 V16.4.0 (Mar. 2021), 3rd Generation Partnership Project; Technical Specification Group Radio Access Network; NR; Medium Access Control (MAC) protocol specification (Release 16), total 157 pages.

* cited by examiner

*Primary Examiner* — Walter J Divito
(74) *Attorney, Agent, or Firm* — Conley Rose, P.C.

(57) ABSTRACT

In a communication method, a first user equipment sends first data to second user equipment over a sidelink (SL); and if the first user equipment does not receive first feedback information, the first user equipment initializes a first counter, or keeps a count value of the first counter unchanged, where the first feedback information indicates whether the second user equipment successfully receives the first data and the first counter is used for RLF detection.

20 Claims, 8 Drawing Sheets

Because reception of a PSFCH conflicts with another transmission and the reception of the PSFCH is not prioritized, do not receive the PSFCH Receive the PSFCH, but fail to receive the PSFCH The PSFCH is received 3 Triggering an SL RLF

| PSFCH monitoring occasion | 1 | 2 | 3 | 4 | 5 | 6 | 7 | 8 | 9 | 10 | 11 |
|---|---|---|---|---|---|---|---|---|---|---|---|
| Status of receiving the PSFCH by a transmit end UE | | | | | | | | | | | |
| Count value of a counter in an existing protocol | 1 | 2 | 0 | 1 | 2 | 3 | 0 | 1 | 2 | 0 | 0 |
| Count value of a first counter | 0 | 1 | 0 | 1 | 2 | 2 | 0 | 0 | 0 | 0 | 0 |

FIG. 7

COMMUNICATION METHOD, APPARATUS, AND SYSTEM

CROSS-REFERENCE TO RELATED APPLICATIONS

This is a continuation of International Patent Application No. PCT/CN2022/085150 filed on Apr. 2, 2022, which claims priority to Chinese Patent Application No. 202110507117.9 filed on May 10, 2021. The disclosures of the aforementioned applications are hereby incorporated by reference in their entireties.

TECHNICAL FIELD

This disclosure relates to the field of sidelink (SL) communication technologies, and in particular, to an SL communication method, apparatus, and system.

BACKGROUND

Vehicle-to-everything (V2X) is a key technology for an intelligent transportation system, and is considered as one of fields with greatest industrial potential and the clearest market demand in an internet of things system. Vehicle-to-everything usually provides vehicle information by using sensors installed on vehicles, vehicle-mounted terminals, or the like, to implement a communication network for vehicle-to-vehicle (V2V), vehicle-to-infrastructure (V2I), vehicle-to-network (V2N), and vehicle-to-pedestrian (V2P) communications.

The V2X is characterized by a wide application space, great industry potential, and strong social benefits, and is of great significance to promote innovation and development of an automobile and information communication industry, build new models and new forms of automobile and transportation services, promote innovation and application of technologies including unmanned driving, assisted driving, intelligent driving, connected driving, intelligent connected driving, automated driving, car sharing, and the like, and improve transportation efficiency and safety.

Usually, in a V2X scenario, a communication link for performing direct communication between a terminal and another terminal may be referred to as an SL or a side link.

Currently, in New Radio (NR) V2X, for unicast and multicast, hybrid automatic repeat request (HARQ) feedback is supported on an SL, where the HARQ feedback is transmitted on a physical SL feedback channel (PSFCH). In addition, for the unicast, an SL radio link failure (RLF) may be detected based on the HARQ. Further, the SL RLF is triggered if a quantity of times that the PSFCH consecutively fails to be received reaches a specific threshold. However, in the conventional technologies, a transmit end may falsely trigger an RLF.

SUMMARY

Embodiments of this disclosure provide a communication method, apparatus, and system, to avoid false triggering of an RLF or reduce a probability of false triggering of the RLF.

To achieve the foregoing objectives, the following technical solutions are used in embodiments of this disclosure.

According to a first aspect, a communication method is provided. A communication apparatus that performs the communication method may be first user equipment, or may be a module used in first user equipment, for example, a chip or a chip system. The following provides descriptions by using an example in which the method is performed by the first user equipment. First user equipment sends first data to second user equipment over an SL. If the first user equipment does not receive first feedback information, the first user equipment initializes a first counter, or keeps a count value of the first counter unchanged. The first feedback information indicates whether the second user equipment successfully receives the first data. The first counter is used for RLF detection. In the communication method provided in this embodiment of this disclosure, the first feedback information is not received by the first user equipment because the first user equipment does not receive the first feedback information, but not because there is a problem in a radio link. The first counter used for the RLF detection does not count a case in which the first feedback information is not received because the first user equipment does not receive the first feedback information, so that the count value of the first counter does not incorrectly/prematurely/quickly reach a count value for triggering an RLF. This avoids false triggering of the RLF, reduces a communication delay, and improves/ensures communication quality or reliability.

According to the first aspect, in a possible implementation, if the first user equipment receives the first feedback information, and the first user equipment fails to receive the first feedback information, the first user equipment increases the count value of the first counter by 1. In the method, that the first user equipment receives but fails to receive the first feedback information may be that the first user equipment fails to receive the first feedback information because there is a problem in a radio link. The first counter counts a case in which the first user equipment receives but fails to receive the first feedback information. Compared with the conventional technologies, in this method, a condition constraint on increasing the count value of the first counter is added, so that the count value of the first counter does not incorrectly/prematurely/quickly reach a count value for triggering an RLF. This avoids false triggering of the RLF, reduces a communication delay, and improves/ensures communication quality or reliability.

According to the first aspect, in a possible implementation, that the first user equipment does not receive first feedback information includes the following. If reception of the first feedback information conflicts with first transmission, the first user equipment does not receive the first feedback information. In the method, the first counter used for the RLF detection does not count a case of resource conflict, so that the first counter can exclude more other reasons that may cause the first feedback information to be not received by the first user equipment, and count as targeted as possible a quantity of times that the first user equipment fails to receive the first feedback information because there is a problem in a radio link, so that the count value of the first counter does not incorrectly/prematurely/quickly reach a count value for triggering the RL. This avoids false triggering of the RLF, reduces a communication delay, and improves/ensures communication quality or reliability.

According to the first aspect, in a possible implementation, that the first user equipment does not receive the first feedback information if reception of the first feedback information conflicts with first transmission includes the following. The reception of the first feedback information conflicts with the first transmission, and a priority of the reception of the first feedback information is lower than or equal to a priority of the first transmission. In the method, if resource conflict occurs, and the priority of the reception of the first feedback information is low, the first feedback information is not received because the first user equipment performs first transmission with a high priority, but does not perform the reception of the first feedback information, but not because there is a problem in a radio link. The first counter used for the RLF detection does not count a case in which the first feedback information is not received because the first user equipment does not receive the first feedback information, so that the count value of the first counter does not incorrectly/prematurely/quickly reach a count value for triggering an RLF. This avoids false triggering of the RLF, reduces a communication delay, and improves/ensures communication quality or reliability.

According to the first aspect, in a possible implementation, that the first user equipment initializes a first counter includes the following. The first user equipment initializes the count value of the first counter to 0.

According to the first aspect, in a possible implementation, signal quality between the first user equipment and the second user equipment is greater than or equal to a first threshold. When the signal quality is good, it indicates that the radio link is normal, and the first counter used for the RLF detection does not count a case in which the first feedback information is not received because the first user equipment does not receive the first feedback information. This avoids false triggering of an RLF, reduces a communication delay, and improves/ensures communication quality or reliability.

According to the first aspect, in a possible implementation, if the signal quality between the first user equipment and the second user equipment is less than or equal to a second threshold, and the first user equipment fails to receive the first feedback information, the first user equipment increases the count value of the first counter by 1. When the signal quality is poor, it indicates that an exception may exist in the radio link may be abnormal. In this case, the first counter used for the RLF detection counts a case in which the first feedback information is not received because the first user equipment does not receive the first feedback information, so that the RLF can be triggered more quickly.

According to the first aspect, in a possible implementation, the first feedback information is transmitted on a PSFCH.

According to the first aspect, in a possible implementation, if the count value of the first counter is greater than or equal to a third threshold, the first user equipment sends first indication information to a network device, where the first indication information indicates that an RLF is detected by the first user equipment. The first user equipment triggers the RLF, and reports the RLF to the network device, to indicate that the radio link is abnormal.

According to a second aspect, a communication apparatus is provided, to implement the foregoing method. The communication apparatus includes a corresponding module, unit, or means for implementing the foregoing method. The module, the unit, or the means may be implemented by hardware or software, or implemented by hardware executing corresponding software. The hardware or the software includes one or more modules or units corresponding to the foregoing functions.

According to the second aspect, in a possible implementation, the communication apparatus includes a transceiver module and a processing module. The transceiver module is configured to send first data to second user equipment over an SL. The processing module is configured to, if first feedback information is not received, initialize a first counter, or keep a count value of the first counter unchanged. The first feedback information indicates whether the second user equipment successfully receives the first data. The first counter is used for RLF detection.

According to the second aspect, in a possible implementation, the transceiver module is further configured to receive the first feedback information, and the processing module is further configured to, if the first feedback information fails to be received, increase the count value of the first counter by 1.

According to the second aspect, in a possible implementation, that first feedback information is not received includes the following. If reception of the first feedback information conflicts with first transmission, the first feedback information is not received.

According to the second aspect, in a possible implementation, that first feedback information is not received includes the following. The reception of the first feedback information conflicts with the first transmission, and a priority of the reception of the first feedback information is lower than or equal to a priority of the first transmission.

According to the second aspect, in a possible implementation, that the processing module is configured to initialize the first counter includes the following. The processing module is configured to initialize the count value of the first counter to 0.

According to the second aspect, in a possible implementation, signal quality between the first user equipment and the second user equipment is greater than or equal to a first threshold.

According to the second aspect, in a possible implementation, the processing module is further configured to, if the signal quality between the first user equipment and the second user equipment is less than or equal to a second threshold, and the first feedback information fails to be received, increase the count value of the first counter by 1.

According to the second aspect, in a possible implementation, the first feedback information is transmitted on a PSFCH.

According to the second aspect, in a possible implementation, the transceiver module is further configured to, if the count value of the first counter is greater than or equal to a third threshold, send first indication information to a network device, where the first indication information indicates that an RLF is detected by the first user equipment.

For technical effects brought by the second aspect and any one of possible implementations of the second aspect, refer to technical effects brought by the first aspect and different implementations of the first aspect. Details are not described herein again.

According to a third aspect, a communication method is provided. A communication apparatus that performs the communication method may be first user equipment, or may be a module used in first user equipment, for example, a chip or a chip system. The following provides descriptions by using an example in which the method is performed by the first user equipment. First user equipment sends first data to second user equipment over an SL. If the first user equipment does not receive first feedback information, the first user equipment increases a count value of a second counter by 1. The first feedback information indicates whether the second user equipment successfully receives the first data, and the second counter is used for counting a quantity of times that feedback information is not received by the first user equipment consecutively.

According to the third aspect, in a possible implementation, if the first user equipment receives the first feedback information, the first user equipment initializes the second counter.

According to the third aspect, in a possible implementation, that the first user equipment initializes the second counter includes the following. The first user equipment initializes the second counter to 0.

According to the third aspect, in a possible implementation, if the count value of the second counter is greater than or equal to a fourth threshold, the first user equipment sends second indication information and/or third indication information to a network device, or the first user equipment triggers resource reselection. The second indication information indicates that an RLF is detected by the first user equipment, indicates that an RLF occurs, or indicates that a cause for an SL failure is an RLF. The third indication information indicates that the count value of the second counter reaches (or greater than or equal to) the fourth threshold, or the count value of the second counter reaches (or less than or equal to) 0 or a second value, indicates that a quantity of times that feedback information is not received by the first user equipment consecutively reaches a preset threshold (for example, the fourth threshold), or indicates that a quantity of times that reception of the feedback information continuously conflicts with another transmission reaches a preset threshold (for example, the fourth threshold).

According to the third aspect, in a possible implementation, the second indication information further indicates a cause for the RLF. The cause includes that a quantity of times that feedback information is not received by the first user equipment consecutively reaches the fourth threshold. In this solution, the first user equipment may report the second indication information (for example, a cause for triggering/detecting the RLF) and/or the third indication information to the network device, to indicate that a current probability of resource conflict is high. Therefore, the network device may correspondingly adjust some parameters to reduce a probability of resource conflict, thereby improving communication quality, reducing a communication delay, and ensuring communication reliability.

According to the third aspect, in a possible implementation, if the RLF is triggered/detected by the first user equipment, the first user equipment may use a corresponding policy, for example, restoring a unicast connection or re-establishing a unicast connection, thereby improving communication quality, reducing a communication delay, and ensuring communication reliability.

According to the third aspect, in a possible implementation, the first user equipment triggers the resource reselection, so that the first user equipment can reselect a resource, thereby reducing a probability of resource conflict/transmission conflict, improving communication quality, reducing a communication delay, and ensuring communication reliability.

According to a fourth aspect, a communication apparatus is provided, to implement the foregoing method. The communication apparatus includes a corresponding module, unit, or means for implementing the foregoing method. The module, the unit, or the means may be implemented by hardware or software, or implemented by hardware executing corresponding software. The hardware or the software includes one or more modules or units corresponding to the foregoing functions.

According to the fourth aspect, in a possible implementation, the communication apparatus includes a transceiver module and a processing module. The transceiver module is configured to send first data to second user equipment over an SL. The processing module is configured to, if first feedback information is not received, increase a count value of a second counter by 1. The first feedback information indicates whether the second user equipment successfully receives the first data, and the second counter is configured to count a quantity of times that feedback information is not received by the first user equipment consecutively.

According to the fourth aspect, in a possible implementation, the transceiver module is further configured to receive the first feedback information, and the processing module is further configured to initialize the second counter.

According to the fourth aspect, in a possible implementation, that the processing module is further configured to initialize the second counter includes the following. The processing module is configured to initialize the second counter to 0.

According to the fourth aspect, in a possible implementation, the transceiver module is further configured to, if a count value of the second counter is greater than or equal to a fourth threshold, send second indication information and/or third indication information to a network device, or the processing module is configured to trigger resource reselection. The second indication information indicates that an RLF is detected by the first user equipment, indicates that an RLF occurs, or indicates that a cause for an SL failure is an RLF. The third indication information indicates that the count value of the second counter reaches (or greater than or equal to) the fourth threshold, or the count value of the second counter reaches (or less than or equal to) 0 or a second value, indicates that a quantity of times that feedback information is not received by the first user equipment consecutively reaches a preset threshold (for example, the fourth threshold), or indicates that a quantity of times that reception of the feedback information continuously conflicts with another transmission reaches a preset threshold (for example, the fourth threshold).

According to the fourth aspect, in a possible implementation, the second indication information further indicates a cause for the RLF. The cause includes that a quantity of times that feedback information is not received by the first user equipment consecutively reaches the fourth threshold.

For technical effects brought by the fourth aspect and any one of the possible implementations of the fourth aspect, refer to technical effects brought by the third aspect and different implementations of the third aspect. Details are not described herein again.

According to a fifth aspect, a communication apparatus is provided, including a processor. The processor is configured to, after being coupled to a memory and reading computer instructions stored in the memory, perform, based on the instructions, the method according to any one of the foregoing aspects.

According to the fifth aspect, in a possible implementation, the communication apparatus further includes the memory, and the memory is configured to store the computer instructions.

According to the fifth aspect, in a possible implementation, the communication apparatus further includes a communication interface, and the communication interface is used by the communication apparatus to communicate with another device. For example, the communication interface may be a transceiver, an input/output interface, an interface circuit, an output circuit, an input circuit, a pin, or a related circuit.

According to the fifth aspect, in a possible implementation, the communication apparatus may be a chip or a chip system. When the communication apparatus is a chip system, the communication apparatus may include a chip, or may include the chip and another discrete device.

According to the fifth aspect, in a possible implementation, when the communication apparatus is the chip or the chip system, the communication interface may be an input/output interface, an interface circuit, an output circuit, an input circuit, a pin, a related circuit, or the like on the chip or the chip system. The processor may also be embodied as a processing circuit or a logic circuit.

According to a sixth aspect, a computer-readable storage medium is provided. The computer-readable storage medium stores instructions. When the instructions are run on a computer, the computer is enabled to perform the method according to any one of the foregoing aspects.

According to a seventh aspect, a computer program product including instructions is provided. When the computer program product runs on a computer, the computer is enabled to perform the method according to any one of the foregoing aspects.

For technical effects brought by any one of the possible implementations of the fifth aspect and the sixth aspect, refer to technical effects brought by different implementations of the first aspect and the third aspect. Details are not described herein again.

BRIEF DESCRIPTION OF DRAWINGS

FIG. 7 is a schematic diagram of a HARQ-based SL RLF detection process in the conventional technologies and a communication method applied to an RLF detection process according to an embodiment of this disclosure;

DESCRIPTION OF EMBODIMENTS

For ease of understanding technical solutions in embodiments of this disclosure, the following first briefly describes technologies or terms related to this disclosure.

First, V2X:

In V2X communication, a communication link for direct communication between a terminal device and another terminal device may be referred to as an SL. A wireless communication link from a terminal device to a network device may be referred to as an uplink (UL). A wireless communication link from a network device to a terminal device may be referred to as a downlink (DL). Because a UL or DL interface may be referred to as a Uu interface, the UL or DL may be referred to as a Uu interface link.

NR V2X supports unicast, multicast, and broadcast services.

It should be noted that the terminals, the terminal devices, the user equipment, and the UE in this disclosure may be replaced with each other.

Second, HARQ:

(1) HARQ Feedback:

A possible HARQ feedback mechanism is as follows: If successfully receiving data, a receive end feeds back a positive acknowledgment (ACK) to a transmit end, or if failing to receive data, the receive end feeds back a negative ACK (NACK) to the transmit end.

In NR V2X, SL HARQ feedback is supported for unicast and multicast.

(2) HARQ Process:

HARQ uses the stop and wait protocol to control data transmission. Further, after sending a transport block (TB), a transmit end stops and waits until feedback information of the TB is received, and then sends a next TB. A process in which the transmit end stops sending and waits for feedback information causes a decrease in throughput.

Figure 1:
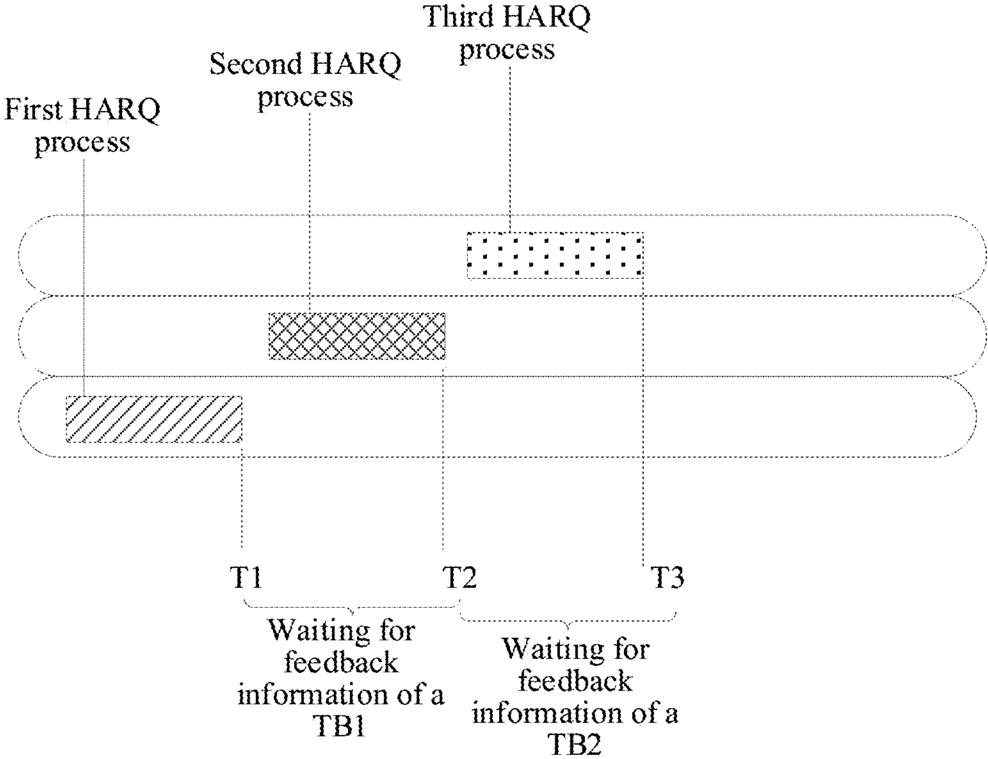
FIG. 1 is a schematic diagram of sending data by a transmit end by using parallel HARQ processes in the conventional technologies.

To improve the throughput, the transmit end may use a plurality of parallel HARQ processes. To be specific, when waiting for feedback information of one HARQ process, the transmit end may continue to send data by using another HARQ process. For example, as shown in FIG. 1, the transmit end sends a TB1 by using a first HARQ process, and at a moment T1, sending of the TB1 is completed. The transmit end waits for feedback information of the TB1, until the feedback information of the TB1 is received by the transmit end at a moment T2. In a waiting time period T1 to T2, the transmit end may send a TB2 by using a second HARQ process. Similarly, after sending of the TB2 is completed at a moment T2, the transmit end waits for feedback information of the TB2, until the feedback information of the TB2 is received by the transmit end at a moment T3. In a waiting time period T2 to T3, the transmit end may send a TB3 by using a third HARQ process.

It should be noted that a HARQ process on a Uu interface may be referred to as a HARQ process. On the Uu interface, one HARQ process may be identified by using one HARQ process identification (ID), or in other words, one HARQ process may be associated with one HARQ process ID.

It should be noted that in NR V2X, a HARQ process on an SL may be referred to as an SL process.

Third, SL Process:

On an SL, transmit end user equipment (UE) may send SL control information (SCI) and SL data to one or more receive end UE. The SCI is used for scheduling the SL data.

In NR V2X, the SCI may include first-level SCI and second-level SCI.

Because the SL data is transmitted through a physical SL shared channel (PSSCH), the SL data may also be referred to as a PSSCH. This is uniformly described herein, and details are not described below. The following separately describes the first-level SCI and the second-level SCI.

The first-level SCI may be used for scheduling the second-level SCI and the SL data/PSSCH. The first-level SCI may be transmitted through a physical SL control channel (PSCCH).

The second-level SCI may be used for decoding the SL data/PSSCH.

The SCI or the second-level SCI may include an SL process ID, a first destination ID, a first source ID, and a communication type (cast type).

In NR V2X, one ID set may identify one SL process, or one SL process may be associated with one ID set.

The ID set may include the SL process ID, the first destination ID, the first source ID, and the communication type, the ID set may include the SL process ID, the first destination ID, and the first source ID, the ID set may include the SL process ID, a second destination ID, a second source ID, and the communication type, or the ID set may include the SL process ID, the second destination ID, and the second source ID.

The following separately describes the SL process ID, the first destination ID, the second destination ID, the first source ID, the second source ID, and the communication type.

(1) SL Process ID:

An SL process ID may be used for identifying an SL process.

(2) First Destination ID and Second Destination ID:

A first destination ID may be used for identifying a target of SL data scheduled by SCI. Optionally, the first destination ID may be used by a physical (PHY) layer of the receive end UE to filter a data packet. For example, the first destination ID may be a destination layer-1 ID. For example, layer 1 may represent a first layer, that is, a physical layer, in an Open System Interconnection (OSI) reference model.

For example, the first destination ID may be some bits of the second destination ID. For example, if the second destination ID is 24 bits, the first destination ID may be 16 least significant bits of the second destination ID.

The second destination ID may be used for identifying a target (for example, a target)/receive end/receiving terminal of data. For example, the second destination ID may be used for identifying a multicast or broadcast service. For example, the second destination ID may be an identifier of the target/receive end/receiving terminal. For example, the second destination ID may be a destination layer-2 ID. Optionally, the second destination ID may be used by a media access control (MAC) layer of the receiving terminal to filter a data packet. For example, layer 2 represents a second layer, that is, a data link layer, in the OSI module, and the data link layer includes a MAC layer.

(3) First Source ID and Second Source ID:

A first source ID may be used for identifying a source of SL data scheduled by SCI. Optionally, the first source ID may be used for performing data packet filtering at a PHY layer of the receiving terminal. For example, the first source ID may be a source layer-1 ID.

For example, the first source ID may be some bits of the second source ID. For example, if the second source ID is 24 bits, the first source ID may be eight least significant bits of the second source ID. The second source ID may be used for identifying a source or a transmit end of data. For example, the second source ID may be a source layer-2 ID.

(4) Communication Type:

A communication type may include any one or more of a unicast, a multicast, and a broadcast. The communication type in SCI indicates that current communication is the unicast, the multicast, or the broadcast. Alternatively, the communication type in the SCI indicates that SL data scheduled by the SCI is unicast data, multicast data, or broadcast data.

For example, a pair of a second source ID and a second destination ID may identify one unicast.

For example, for the unicast, the second destination ID and the second source ID may be used when a MAC layer of receive end UE filters a data packet.

For example, for the unicast, a first destination ID and a first source ID may be used when a physical layer of the receive end UE filters a data packet.

Fourth, reception of a PSFCH conflicts with another transmission/reception.

For example, the following describes three cases in which reception of a PSFCH conflicts with another transmission/reception.

For example, conflict may include conflict in a time domain, or conflict in a slot.

For example, the conflict may be understood/replaced with overlap or coincide.

The reception of the PSFCH is associated with SCI1 and/or SL data 1. It may be understood that, after transmit end UE sends the SCI1 and/or the SL data 1 to receive end UE, the transmit end UE may receive SL HARQ feedback (which may be understood as the reception of the PSFCH) of the receive end UE on a PSFCH resource 1.

(1) Reception of a PSFCH Conflicts with Sending of the PSFCH.

Reception of a PSFCH (for transmission of SL data 1) conflicts with the sending of the PSFCH (which is associated with other data transmission). If a priority of the reception of the PSFCH is lower than or equal to a priority of the sending of the PSFCH (or the reception of the PSFCH is not prioritized), transmit end UE of the SL data 1 performs the sending of the PSFCH, but does not perform the reception of the PSFCH. Therefore, the PSFCH is not received by the transmit end UE of the SL data 1.

It should be noted that the transmit end UE of the SL data 1 may also be used as receive end UE of SL data 2, to send the PSFCH to transmit end UE of the SL data 2.

It should be noted that a priority of the reception or sending of the PSFCH is determined by a priority of SL data associated with the PSFCH. A priority field in SCI or first-level SCI corresponding to the SL data carries priority information of the SL data. A smaller value of the priority field indicates a higher priority of the SL data.

(2) Reception of a PSFCH Conflicts with a UL Transmission.

Reception of a PSFCH (for transmission of SL data 1) conflicts with a UL transmission. If a priority of the reception of the PSFCH is lower than or equal to a priority of the UL transmission (or the reception of the PSFCH is not prioritized), transmit end UE performs the UL transmission, but does not perform the reception of the PSFCH. Therefore, the PSFCH is not received by the transmit end UE. "Transmission" may be understood as "sending and/or receiving".

For example, that reception of a PSFCH (for transmission of SL data 1) conflicts with a UL transmission may include that the reception of the PSFCH (for transmission of SL data 1) conflicts with the UL transmission in one slot. It should be noted that, in a possible implementation, a priority of reception of a PSFCH in one slot may be a highest priority in priorities of SL data corresponding to a plurality of PSFCHs in the slot.

(3) Reception of an NR SL PSFCH Conflicts with a Long-Term Evolution (LTE) SL Transmission.

In an NR SL transmission, at transmit end UE, reception of a PSFCH conflicts with an LTE SL transmission in terms of time. If a priority of the reception of the PSFCH is lower than or equal to a priority of the LTE SL transmission (or in other words, the reception of the PSFCH is not prioritized), the transmit end UE performs the LTE SL transmission, but does not perform the reception of the PSFCH. Therefore, the PSFCH is not received by the transmit end UE.

It should be noted that a priority of the reception or sending of the PSFCH is determined by a priority of SL data associated with the PSFCH. A priority field in SCI or first-level SCI corresponding to the SL data carries priority information of the SL data. A smaller value of the priority field indicates a higher priority of the SL data.

It should be noted that different priority levels are defined in an NR system and an LTE system. For comparison of transmission priorities in the foregoing two systems, refer to the conventional technologies. Details are not described herein again.

It should be noted that the foregoing conflict may be understood as conflict in one UE (transmit end UE).

It should be noted that a transmit end may be understood as a transmit end of data.

It should be noted that, the foregoing conflict situation and the priority comparison in the conflict situation belong to the conventional technologies. Details are not described herein again. For specific content, refer to the description in 3GPP TS 38.213: "NR; Physical Layer Procedures for Control" and 3GPP TS 38.321: "NR; Medium Access Control (MAC) Protocol Specification". Details are not described herein again.

Fifth, HARQ-Based SL RLF Detection:

In NR V2X, HARQ-based SL RLF detection is introduced for a unicast connection. Transmit end UE uses a counter to count a quantity of times that a PSFCH is not received consecutively. Further, if the transmit end UE fails to receive the PSFCH, the transmit end increases a count value of the counter by 1. If the PSFCH is received by the transmit end UE, the transmit end UE initializes/sets a count value of the counter to 0. If the count value of the counter reaches a threshold, the transmit end UE triggers an RLF. For details, refer to section 5.22.1.3.3 in 3GPP TS 38.321: "NR; Medium Access Control (MAC) Protocol Specification".

The unicast connection is established, or the threshold is configured or reconfigured. The transmit end UE initializes/sets the count value of the counter to 0.

The counter may be numConsecutiveDTX. The threshold may be sl-maxNumConsecutiveDTX. A value of the threshold is configured by a network device, or a value of the threshold is preconfigured.

Figure 2:
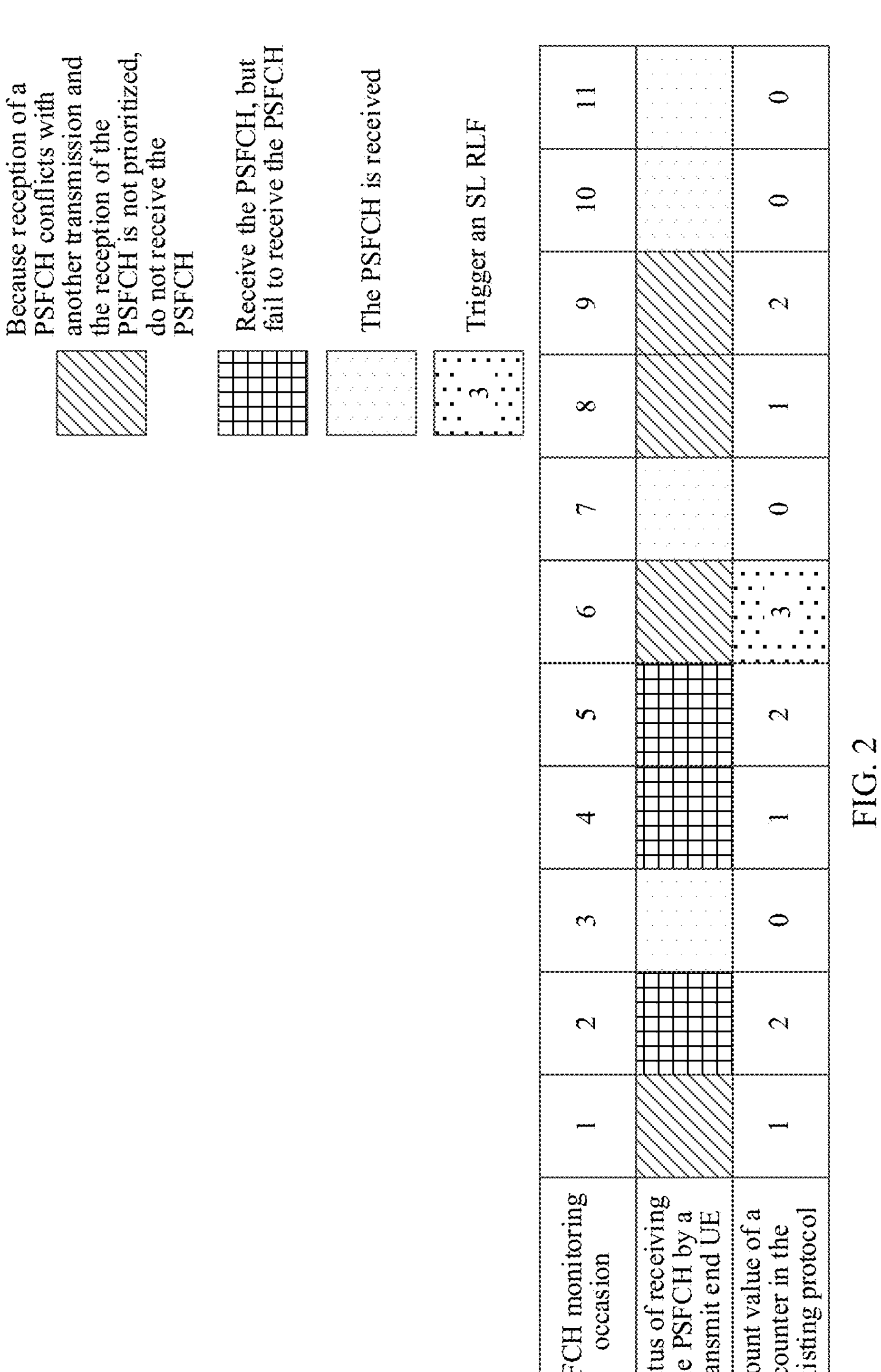
FIG. 2 is a schematic diagram of a HARQ-based SL RLF detection process in the conventional technologies.

For example, FIG. 2 shows a HARQ-based SL RLF detection process. An initial value of the counter is 0. A threshold for triggering the RLF is 3. For example, a PSFCH monitoring occasion may be understood as a PSFCH, a location of the PSFCH, a time domain location of the PSFCH, or a PSFCH reception occasion. It should be noted that FIG. 2 shows only 11 PSFCH monitoring occasions as an example. Actual PSFCH monitoring occasions may be consecutive or inconsecutive in time domain, and different PSFCH monitoring occasions may alternatively overlap in time domain. This is not limited in this embodiment of this disclosure.

That transmit end UE "receives" a PSFCH indicates that the transmit end UE performs an action of "receiving" the PSFCH. A result of "receiving" the PSFCH by the transmit end UE may be that the PSFCH "is received by" the transmit end UE, or may be that the transmit end UE "fails to receive" the PSFCH.

That the transmit end UE "does not receive" the PSFCH indicates that the transmit end UE does not perform an action of "receiving" the PSFCH. When the transmit end UE "receiving" the PSFCH conflicts with another transmission/reception of the transmit end UE, because a priority of "receiving" the PSFCH is lower than a priority of another transmission/reception (or the "receiving" the PSFCH is not prioritized), the transmit end UE performs another transmission/reception, but not perform the action of "receiving" the PSFCH. A result of "not receiving" the PSFCH by the transmit end UE is that the PSFCH "is not received by" the transmit end UE.

On a first PSFCH monitoring occasion, because reception of the PSFCH conflicts with another transmission and the reception of the PSFCH is not prioritized, the transmit end UE does not receive the PSFCH. Therefore, the PSFCH is not received by the transmit end UE. In the existing protocol, a count value of a counter is increased by 1, and an initial value is changed from 0 to 1.

On a second PSFCH monitoring occasion, the transmit end UE receives the PSFCH but fails to receive the PSFCH. In the existing protocol, the count value of the counter is increased by 1, and becomes 2.

On a third PSFCH monitoring occasion, the PSFCH is received by the transmit end UE. In the existing protocol, the count value of the counter is initialized/set to 0.

On a fourth PSFCH monitoring occasion, the transmit end UE receives the PSFCH but fails to receive the PSFCH. In the existing protocol, the count value of the counter is increased by 1, and becomes 1.

On a fifth PSFCH monitoring occasion, the transmit end UE receives the PSFCH but fails to receive the PSFCH. In the existing protocol, the count value of the counter is increased by 1, and becomes 2.

On a sixth PSFCH monitoring occasion, because the reception of the PSFCH conflicts with another transmission and the reception of the PSFCH is not prioritized, the transmit end UE does not receive the PSFCH. Therefore, the PSFCH is not received by the transmit end UE. In the existing protocol, the count value of the counter is increased by 1, and becomes 3. Because the count value of the counter in the existing protocol reaches a threshold, the transmit end UE triggers an RLF.

On a seventh PSFCH monitoring occasion, the PSFCH is received by the transmit end UE. In the existing protocol, the count value of the counter is initialized/set to 0.

On an eighth PSFCH monitoring occasion, because the reception of the PSFCH conflicts with another transmission and the reception of the PSFCH is not prioritized, the transmit end UE does not receive the PSFCH. Therefore, the PSFCH is not received by the transmit end UE. In the existing protocol, the count value of the counter is increased by 1, and an initial value is changed from 0 to 1.

On a ninth PSFCH monitoring occasion, because the reception of the PSFCH conflicts with another transmission and the reception of the PSFCH is not prioritized, the transmit end UE does not receive the PSFCH. Therefore, the PSFCH is not received by the transmit end UE. In the existing protocol, the count value of the counter is increased by 1, and becomes 2.

On a tenth PSFCH monitoring occasion, the PSFCH is received by the transmit end UE. In the existing protocol, the count value of the counter is initialized/set to 0.

On an eleventh PSFCH monitoring occasion, the PSFCH is received by the transmit end UE. In the existing protocol, the count value of the counter is initialized/set to 0, or the count value of the first counter is kept unchanged and is still 0.

It should be understood that, the seventh PSFCH monitoring occasion and subsequent PSFCH monitoring occasions in FIG. 2 may refer to PSFCHs corresponding to SL transmission performed after a unicast connection is recovered. It may be understood that, after the RLF is triggered, to restore the unicast connection, the seventh PSFCH monitoring occasion and subsequent PSFCH monitoring occasions in FIG. 2 may not exist.

It can be learned from the foregoing analysis that, on the fifth PSFCH monitoring occasion, the value of the counter is 2. On the sixth PSFCH monitoring occasion, the PSFCH is not received by the transmit end UE because the transmit end UE does not receive the PSFCH, but not because there is a problem in a radio link. In existing HARQ-based SL RLF detection, on the sixth PSFCH monitoring occasion, the count value of the counter increases by 1. As a result, the count value of the counter reaches a threshold 3, and the transmit end UE falsely triggers the RLF. Consequently, a communication delay is increased, and communication quality or reliability is reduced. Particularly, when the threshold is 1, by using the existing HARQ-based SL RLF detection, the transmit end UE is more likely to falsely trigger the RLF.

It should be noted that currently, in NR V2X, the HARQ-based SL RLF detection is performed for the unicast connection, and the counter is also separately maintained for each unicast connection. Herein, a quantity of times that the PSFCH is not received consecutively may be understood as the following. For the unicast connection (for example, one unicast connection), a quantity of times that the PSFCH is not received consecutively, or for all SL processes of the unicast connection (for example, one unicast connection), a quantity of times that the PSFCH is not received consecutively.

The unicast connection may also be referred to as a Radio Resource Control (RRC) connection of an SL, or a PC5-RRC connection. The unicast connection may be a logical connection between a pair of a second source ID and a second destination ID. Alternatively, the unicast connection may be a logical connection between a pair of a second source ID and a second destination ID at an access stratum (AS) layer. The unicast connection may include/be replaced with/correspond to any one or more of the following: a unicast, a unicast connection, a destination address, and an ID pair of a second source ID and a second destination ID. The destination address (or destination) may be understood as a corresponding ID pair of a second source ID and a second destination ID.

For example, the RLF in this disclosure may include/be understood as an SL RLF.

For example, the initialization in this disclosure may include/be replaced with re-initialization.

For example, the first user equipment in this disclosure may include/be replaced with a HARQ entity of the first user equipment, an SL HARQ entity of the first user equipment, or a MAC entity of the first user equipment.

For example, the unicast connection in this disclosure may include/be replaced with one unicast connection or a first unicast connection.

For example, an SL process associated with the unicast connection in this disclosure may include/be replaced with any one or more of the following: an SL process associated with the destination address, an SL process associated with the pair of the second source ID and the second destination ID, and an SL process associated with a pair of a first source ID and a first destination ID.

The following describes the technical solutions in embodiments of this disclosure with reference to the accompanying drawings in embodiments of this disclosure. In descriptions of this disclosure, "/" represents an "or" relationship between associated objects unless otherwise specified. For example, A/B may represent A or B. In this disclosure, "and/or" describes only an association relationship for describing associated objects and represents that three relationships may exist. For example, A and/or B may represent the following three cases: only A exists, both A and B exist, and only B exists, where A and B may be singular or plural. In addition, in the descriptions of this disclosure, "a plurality of" means two or more than two unless otherwise specified. At least one of the following items (pieces) or a similar expression thereof refers to any combination of these items, including any combination of singular item (piece) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this disclosure, terms such as "first" and "second" are used in embodiments of this disclosure to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that, in this disclosure, terms such as "an example" or "for example" are used to represent giving an example, an illustration, or a description. Any embodiment or design scheme described as an "example" or "for example" in this disclosure should not be explained as being more preferred or having more advantages than another embodiment or design scheme. Exactly, use of the word such as "example" or "for example" is intended to present a relative concept in a specific manner.

The method provided in embodiments of this disclosure is applicable to but is not limited to the following fields: device-to-device (D2D), V2X, unmanned driving, automated driving (such as automated driving systems (ADS)), driver assistance (such as advanced driver assistance systems (ADAS)), intelligent driving, connected driving, intelligent connected driving, car sharing, and the like.

The communication system in embodiments of this disclosure includes but is not limited to a LTE system, a $5^{th}$ generation (5G) system, an NR system, a wireless local area network (WLAN) system and a future evolved system, or a plurality of converged communication systems. The 5G system may be a non-standalone (NSA) 5G system or a standalone (SA) 5G system.

A network device in embodiments of this disclosure is a network-side entity configured to send a signal, receive a signal, or send a signal and receive a signal. The network device may be an apparatus that is deployed on a radio access network (RAN) and that provides a wireless communication function for a terminal. For example, the network device may be a transmission reception point (TRP), a base station, or control nodes in various forms (for example, a network controller and a radio controller (for example, a radio controller in a cloud radio access network (CRAN) scenario)). Further, the network device may be a macro base station, a micro base station (or a small cell), a relay station, an access point (AP), or the like in various forms, or may be an antenna panel of a base station. The control node may be connected to a plurality of base stations, and configure resources for a plurality of terminals within coverage of the plurality of base stations. In systems that use different radio access technologies, names of devices having functions of a base station may vary. For example, a device having a function of a base station may be referred to as an evolved NodeB (eNB or eNodeB) in an LTE system, or may be referred to as a next generation node base station (gNB) in a 5G system or an NR system. A specific name of the base station is not limited in this disclosure. The network device may alternatively be a network device in a future evolved public land mobile network (PLMN) or the like.

The terminal in embodiments of this disclosure is a user-side entity configured to receive a signal, send a signal, or receive a signal and send a signal. The terminal is configured to provide users with one or more of a voice service and a data connectivity service. The terminal may also be referred to as user equipment (UE), a terminal device, an access terminal, a subscriber unit, a subscriber station, a mobile station, a remote station, a remote terminal, a mobile device, a user terminal, a wireless communication device, a user agent, or a user apparatus. The terminal may be a V2X device, for example, a smart car (smart car or intelligent car), a digital car, an unmanned car (unmanned car, driverless car, pilotless car, or automobile), a self-driving car (self-driving car or autonomous car), a pure electric vehicle (pure EV or Battery EV), a hybrid electric vehicle (HEV), a range extended electric vehicle (REEV), a plug-in hybrid electric vehicle (PHEV), a new energy vehicle, or a road side unit (RSU). Alternatively, the terminal may be a D2D device, for example, an electricity meter or a water meter. Alternatively, the terminal may be a mobile station (MS), a subscriber unit, an unmanned aerial vehicle, an Internet of things (IoT) device, a station (ST) in a WLAN, a cellular phone, a smartphone, a cordless telephone set, a wireless data card, a tablet computer, a Session Initiation Protocol (SIP) phone, a wireless local loop (WLL) station, a personal digital assistant (PDA) device, a laptop computer, a machine type communication (MTC) terminal, a handheld device having a wireless communication function, a computing device, another processing device connected to a wireless modem, a vehicle-mounted device, or a wearable device (or a wearable intelligent device). Alternatively, the terminal may be a terminal in a next generation communication system, for example, a terminal in the 5G system, a terminal in the future evolved PLMN, or a terminal in the NR system.

Embodiments of this disclosure are applicable to an NR system, and may also be applicable to another system, for example, another future-oriented new system. This is not limited in embodiments of this disclosure. In addition, the terms “system” and “network” are interchangeable.

Figure 3:
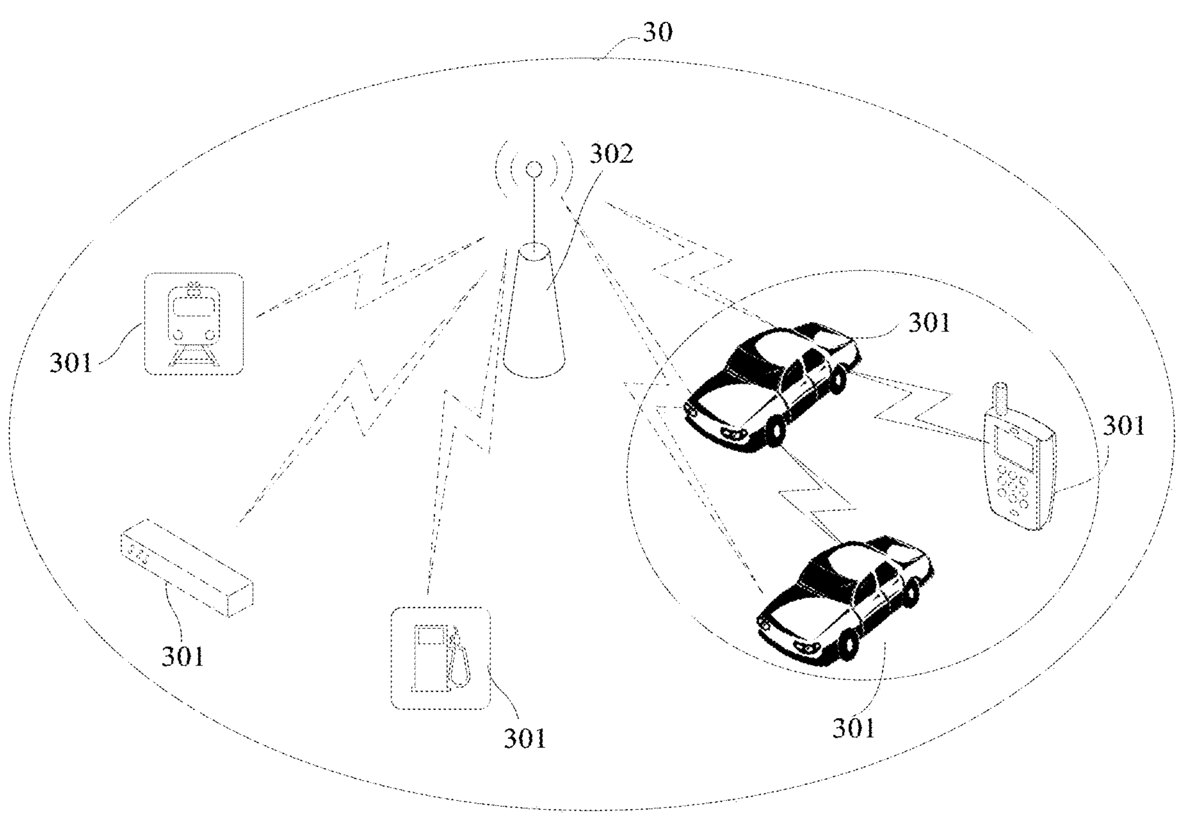
FIG. 3 is a schematic diagram of an architecture of a communication system according to an embodiment of this disclosure.

FIG. 3 shows a communication system 30 according to an embodiment of this disclosure. The communication system 30 includes one or more user equipment 301. Different user equipment 301 may communicate with each other over an SL.

For example, first user equipment in this embodiment of this disclosure may be one of any two user equipment 301 that communicate with each other, and the other user equipment may be second user equipment in this embodiment of this disclosure.

Optionally, the communication system further includes a network device 302. The network device 302 may separately communicate with the user equipment 301 over a UL or DL. For example, in a broadcast scenario, to ensure that another terminal apparatus having a service discontinuous reception (DRX) requirement can receive a broadcast signal, the user equipment 301 may send related request information to the network device 302. This is not limited in this embodiment of this disclosure.

It should be noted that FIG. 3 is merely a schematic diagram. The communication system 30 may further include other network devices, for example, one or more of a core network device, a wireless relay device, and a wireless backhaul device though other network devices are not shown in FIG. 3. This is not limited herein. The network device may be connected to the core network device in a wireless or wired manner. The core network device and the network device 302 may be different independent physical devices, functions of the core network device and logical functions of the network device 302 may be integrated into a same physical device, or some functions of the core network device and some functions of the network device 302 may be integrated into one physical device. This is not limited in this embodiment of this disclosure.

Optionally, the network device 302 in this embodiment of this disclosure is a device that enables the user equipment 301 to access a wireless network. The network device 302 may be a base station, an eNodeB, a TRP, a next generation base station (gNB) in a 5G mobile communication system, a base station in a future mobile communication system, an access node in a WI-FI system, or the like, or may be a module or unit that completes some of functions of the base station, for example, may be a central unit (CU), or may be a distributed unit (DU). A specific technology and a specific device form that are used by the network device are not limited in embodiments of this disclosure. In this disclosure, unless otherwise specified, the network device is a radio access network device.

Optionally, the user equipment 301 in this embodiment of this disclosure may be a vehicle, or may be a vehicle-mounted terminal installed on a vehicle and configured to assist in driving of the vehicle, or a chip in a vehicle-mounted terminal. Alternatively, the user equipment 301 in this embodiment of this disclosure may be a device configured to implement a wireless communication function, for example, a terminal or a chip that may be used in a terminal. The vehicle-mounted terminal or the terminal may be UE, an access terminal, a terminal unit, a terminal station, a mobile station, a remote station, a remote terminal, a mobile device, a wireless communication device, a terminal agent, UE, or the like in a 5G network or a future evolved PLMN. The access terminal may be a cellular phone, a cordless phone, a SIP phone, a WLL station, a PDA, a handheld device with a wireless communication function, a computing device or another processing device connected to a wireless modem, a vehicle-mounted device or a wearable device, virtual reality (VR) UE, augmented reality (AR) UE, a wireless terminal in industrial control or a wireless terminal in self-driving, a wireless terminal in telemedicine, a wireless terminal in a smart grid, a wireless terminal in transportation security, a wireless terminal in a smart city, a wireless terminal in a smart home, and the like. The user equipment 301 may be at a fixed location, or may be movable. This is not limited in this embodiment of this disclosure.

Optionally, in this embodiment of this disclosure, the user equipment 301 includes a hardware layer, an operating system layer running above the hardware layer, and an application layer running above the operating system layer. The hardware layer includes hardware such as a central processing unit (CPU), a memory management unit (MMU), and a memory (or a main memory). An operating system may be any one or more types of computer operating systems that implement service processing through a process, for example, a LINUX operating system, a UNIX operating system, an ANDROID operating system, an IOS operating system, or a WINDOWS operating system. The application layer includes applications such as a browser, an address book, word processing software, and instant messaging software. In addition, a specific structure of an execution entity of a method provided in embodiments of this disclosure is not limited in embodiments of this disclosure, provided that a program that records code of the method provided in embodiments of this disclosure can be run to perform communication according to the method provided in embodiments of this disclosure. For example, the method provided in this embodiment of this disclosure may be executed by the user equipment 301, or may be a functional module that is in the user equipment 301 and that can call and execute a program.

In other words, related functions of the user equipment 301 in this embodiment of this disclosure may be implemented by one device, may be implemented by a plurality of devices together, or may be implemented by one or more functional modules in one device. This is not further limited in this embodiment of this disclosure. It may be understood that the foregoing function may be a network element in a hardware device, may be a software function running on dedicated hardware, a combination of hardware and software, or a virtualization function instantiated on a platform (for example, a cloud platform).

Figure 4:
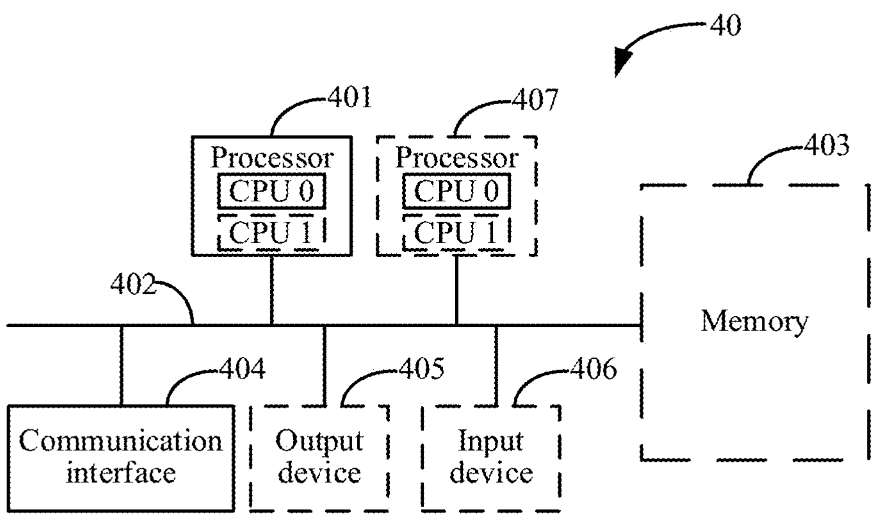
FIG. 4 is a schematic diagram of a structure of a communication apparatus according to an embodiment of this disclosure.

For example, a related function of the user equipment 301 in this embodiment of this disclosure may be implemented by using a communication apparatus 40 in FIG. 4. FIG. 4 is a schematic diagram of a structure of a communication apparatus 40 according to an embodiment of this disclosure. The communication apparatus 40 includes one or more processors 401, a communication line 402, and at least one communication interface (where in FIG. 4, an example in which a communication interface 404 and one processor 401 are included is merely used for description), and optionally, may further include a memory 403.

The processor 401 may be one CPU, one microprocessor, one application-specific integrated circuit (ASIC), or one or more integrated circuits for controlling program execution of the solutions of this disclosure.

The communication line 402 may include a path for connecting different components.

The communication interface 404 may be a transceiver module configured to communicate with another device or a communication network, such as the Ethernet, a RAN, or a wireless local area network (WLAN). For example, the transceiver module may be an apparatus such as a transceiver apparatus or a transceiver unit. Optionally, the communication interface 404 may alternatively be a transceiver circuit located in the processor 401, and is configured to implement signal input and signal output of the processor.

The memory 403 may be an apparatus having a storage function. For example, the memory may be a read-only memory (ROM) or another type of static storage device capable of storing static information and instructions, may be a random-access memory (RAM) or another type of dynamic storage device capable of storing information and instructions, or may be an electrically erasable programmable ROM (EEPROM), a compact disc (CD) ROM (CD-ROM) or other CD storage, optical disc storage (including a compressed optical disc, a laser disc, an optical disc, a DIGITAL VERSATILE DISC (DVD), a BLU-RAY disc, and the like), a magnetic disk storage medium or another magnetic storage device, or any other medium capable of carrying or storing expected program code in a form of an instruction or a data structure and capable of being accessed by a computer. However, the memory is not limited thereto. The memory may exist independently, and is connected to the processor through the communication line 402. The memory may alternatively be integrated with the processor.

The memory 403 is configured to store computer-executable instructions for performing the solutions in this disclosure, and the processor 401 controls execution. The processor 401 is configured to execute the computer-executable instructions stored in the memory 403, to implement communication methods provided in embodiments of this disclosure.

Alternatively, in this embodiment of this disclosure, the processor 401 may implement a processing-related function in the communication methods provided in the following embodiments of this disclosure, and the communication interface 404 is responsible for communicating with another device or a communication network. This is not limited in this embodiment of this disclosure.

The computer-executable instructions in embodiments of this disclosure may also be referred to as application program code. This is not limited in embodiments of this disclosure.

During specific implementation, in an embodiment, the processor 401 may include one or more CPUs, for example, a CPU 0 and a CPU 1 in FIG. 4.

During specific implementation, in an embodiment, the communication apparatus 40 may include a plurality of processors, for example, the processor 401 and a processor 407 in FIG. 4. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the communication apparatus 40 may further include an output device 405 and an input device 406. The output device 405 communicates with the processor 401, and may display information in a plurality of manners.

The communication apparatus 40 may be a general-purpose apparatus or a dedicated apparatus. For example, the communication apparatus 40 may be a desktop computer, a portable computer, a network server, a PDA, a mobile phone, a tablet computer, a wireless terminal apparatus, a vehicle-mounted terminal apparatus, an embedded device, or a device having a structure similar to that in FIG. 4. A type of the communication apparatus 40 is not limited in embodiments of this disclosure.

Figure 5:
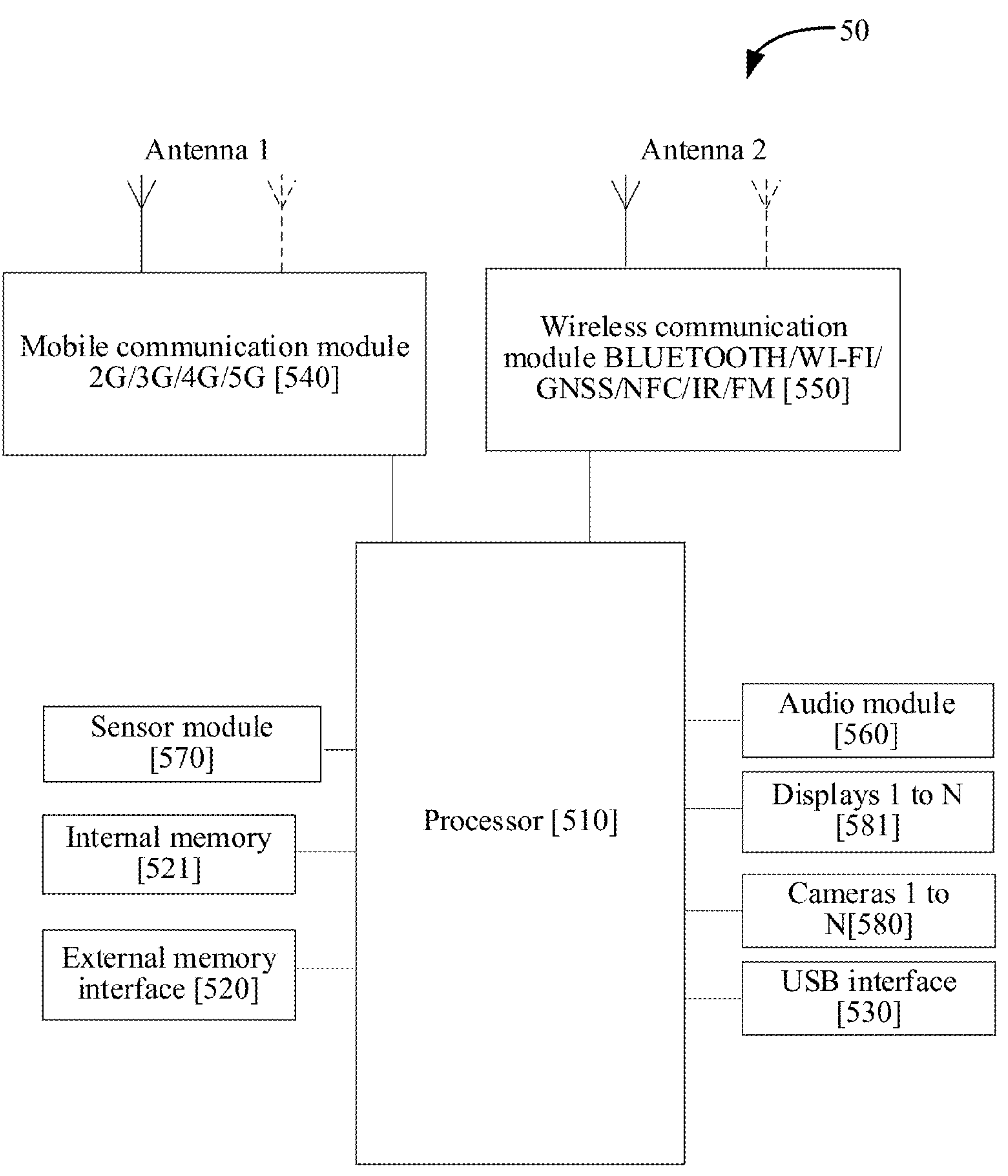
FIG. 5 is a schematic diagram of a structure of a mobile terminal according to an embodiment of this disclosure.

For example, the user equipment 301 in FIG. 3 is a mobile terminal. FIG. 5 is a schematic diagram of a structure of a mobile terminal 50.

As shown in FIG. 5, the mobile terminal 50 may include a processor 510, an external memory interface 520, an internal memory 521, a Universal Serial Bus (USB) interface 530, a mobile communication module 540, a wireless communication module 550, an audio module 560, a sensor module 570, a camera 580, a display 581, and the like.

It may be understood that the structure shown in this embodiment of this disclosure does not constitute a specific limitation on the mobile terminal 50. In some other embodiments of this disclosure, the mobile terminal 50 may include more or fewer components than those shown in the figure, or some components may be combined, or some components may be divided, or different component arrangements may be used. The components shown in the figure may be implemented by hardware, software, or a combination of software and hardware.

In this embodiment of this disclosure, the processor 510 may include one or more processing units. For example, the processor 510 may include an application processor (AP), a modem processor, a graphics processing unit (GPU), an image signal processor (ISP), a controller, a memory, a video codec, a digital signal processor (DSP), a baseband processor, a neural processing unit (NPU), and/or the like. Different processing units may be independent components, or may be integrated into one or more processors.

In addition, the memory configured to store instructions and data may be further disposed in the processor 510. In some embodiments, the memory in the processor 510 is a cache. The memory may store instructions or data that is recently used or to be cyclically used by the processor 510. If needing to use the instructions or the data again, the processor 510 may directly call the instructions or the data from the memory. This avoids repeated access and reduces a waiting time of the processor 510, thereby improving system efficiency.

In this embodiment of this disclosure, a wireless communication function of the mobile terminal 50 may be implemented by using an antenna 1, an antenna 2, the mobile communication module 540, the wireless communication module 550, a modem processor, a baseband processor, and the like.

The antenna 1 and the antenna 2 are configured to transmit and receive electromagnetic wave signals.

The mobile communication module 540 may provide a solution including $2^{nd}$ generation (2G)/$3^{rd}$ generation (3G)/$4^{th}$ generation (4G)/$5^{th}$ generation (5G), or other wireless communications applicable to the mobile terminal 50. In some embodiments, at least some functional modules of the mobile communication module 540 may be disposed in the processor 510. In some embodiments, at least some functional modules of the mobile communication module 540 and at least some modules of the processor 510 may be disposed in a same component.

The wireless communication module 550 may provide a solution including a WLAN (for example, BLUETOOTH (BT), a WI-FI network), a global navigation satellite system (GNSS), a near-field communication (NFC), an infrared technology (IR), a frequency modulation (FM), or other wireless communications applicable to the mobile terminal 50.

In some embodiments, the antenna 1 of the mobile terminal 50 is coupled to the mobile communication module 540, and the antenna 2 is coupled to the wireless communication module 550, so that the mobile terminal 50 can communicate with a network and another device through a wireless communication technology.

In this embodiment of this disclosure, the mobile terminal 50 implements a display function through the GPU, the display 581, the application processor, and the like. The GPU is a microprocessor for image processing, and is connected to the display 581 and the application processor. The GPU is configured to perform mathematical and geometric calculations for graphics rendering. The processor 510 may include one or more GPUs that execute program instructions to generate or change display information.

The display 581 is configured to display an image, a video, or the like. The display 581 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the mobile terminal 50 may include one or N displays 581, where N is a positive integer greater than 1.

In this embodiment of this disclosure, the mobile terminal 50 may implement a photographing function through the ISP, the camera 580, the video codec, the GPU, the display 581, the application processor, and the like.

The camera 580 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as a red, green, and blue (RGB) or luma, blue projection, and red projection (YUV). In some embodiments, the mobile terminal 50 may include one or N cameras 580, where N is a positive integer greater than 1.

In this embodiment of this disclosure, the external memory interface 520 may be configured to connect to an external storage card, such as a micro Secure Digital (SD) card, to expand a storage capability of the mobile terminal 50. The external storage card communicates with the processor 510 through the external memory interface 520, to implement a data storage function. For example, files such as music and a video are stored on the external storage card.

In this embodiment of this disclosure, the internal memory 521 may be configured to store computer executable program code. The executable program code includes instructions. The internal memory 521 may include a program storage area and a data storage area. The program storage area may store an operating system, an application required by at least one function (such as a sound playback function and an image display function), and the like. The data storage area may store data (such as audio data or an address book) created in a process of using the mobile terminal 50, and the like. In addition, the internal memory 521 may include a high-speed RAM, and may further include a non-volatile memory, such as at least one magnetic disk storage component, a flash memory, or a universal flash storage (UFS). The processor 510 executes various functional applications and data processing of the mobile terminal 50 by running the instructions stored in the internal memory 521 and/or the instructions stored in the memory disposed in the processor.

In this embodiment of this disclosure, the sensor module 570 may include an acceleration sensor, a gyro sensor, a Global Positioning System (GPS) sensor, a touch sensor, and the like.

Certainly, the mobile terminal 50 may further include a charging management module, a power management module, a battery, a button, an indicator, one or more subscriber identity module (SIM) card interfaces, and the like. This is not limited in this embodiment of this disclosure.

In the conventional technologies, when a time at which a transmit end receives a PSFCH conflicts with a time at which the transmit end sends or receives other information, if a priority of sending or receiving the other information by the transmit end is higher than a priority of reception of the PSFCH, the transmit end performs sending or receiving of the other information, and therefore cannot receive the PSFCH. Clearly, this is not caused by a problem in a radio link that causes the transmit end to fail to receive the PSFCH. However, because the transmit end fails to receive the PSFCH in this case, the transmit end still increases a count value of a counter by 1, which may cause the count value of the counter to reach a preset threshold. Consequently, the transmit end falsely triggers an RLF, affecting communication quality, causing a communication delay, and affecting communication quality.

It may be understood that, according to the content in the existing protocol, if the RLF is triggered falsely, a specific time may be required between the transmit end and a receive end to restore/re-establish a connection (such as a unicast connection) to continue normal communication. It may be understood that false triggering of the RLF causes a specific communication delay, and also affects communication quality.

An example in which first user equipment is one of any two user equipment 301 that communicate with each other is used below to describe in detail the communication method provided in embodiments of this disclosure with reference to FIG. 1 to FIG. 5.

It should be understood that, in the following method embodiments, only an example in which the execution entities are the first user equipment and second user equipment is used, but the first user equipment and the second user equipment are not necessarily limited. The first user equipment and the second user equipment may be replaced with devices that can implement the method in this disclosure. For example, the first user equipment may further be replaced with a chip or a first device configured in the first user equipment, and the second user equipment may also be replaced with a chip or a second device configured in the second user equipment.

Figure 6A:
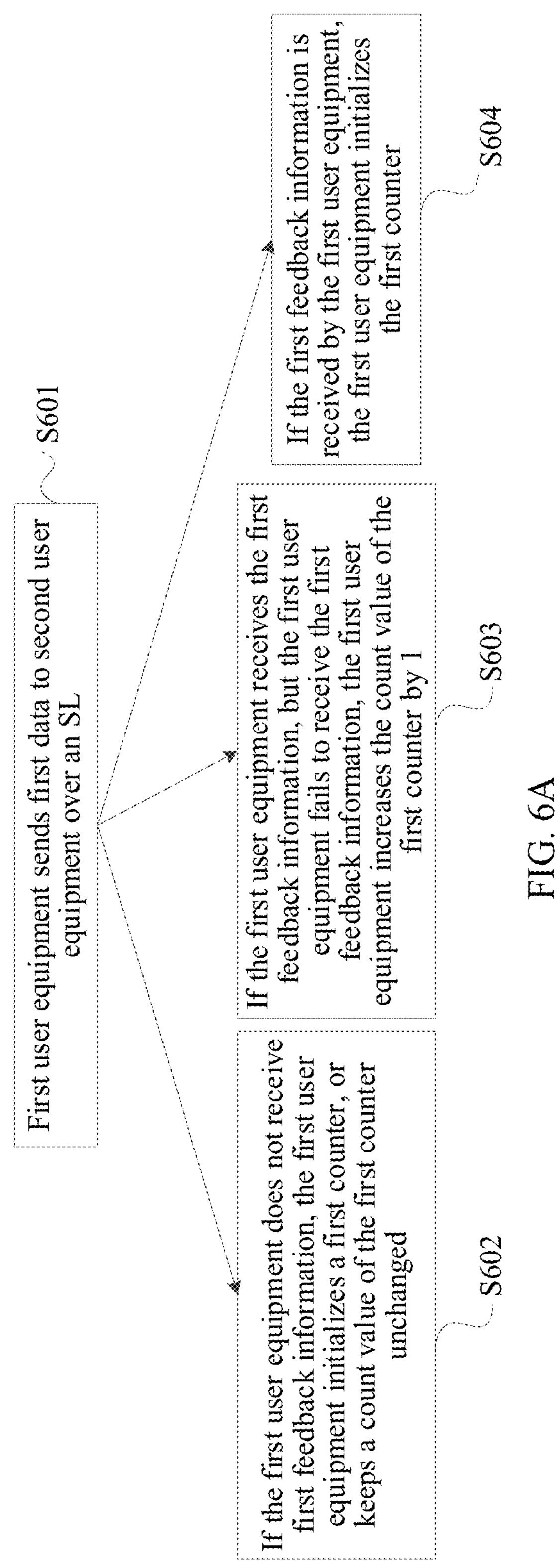
FIG. 6A is a flowchart of a communication method according to an embodiment of this disclosure.

FIG. 6A shows a communication method according to an embodiment of this disclosure. The communication method includes the following steps.

S601: First user equipment sends first data to second user equipment over an SL.

Optionally, step S601 may include/be replaced with the following. For a unicast connection, first user equipment sends first data to second user equipment over an SL.

For example, the first data may be SL data.

Optionally, step S601 may be replaced with the following. First user equipment sends first control information to second user equipment over an SL, or first user equipment sends first control information and first data to second user equipment over an SL.

The first control information is used for scheduling the first data.

For example, the first control information may be SCI or first-level SCI.

It may be understood that the first user equipment may send only the first control information to the second user equipment over the SL, or may send both the first control information and the first data to the second user equipment. For example, the first user equipment sends the first control information to the second user equipment over the SL, but may fail to send the first data due to some reasons (for example, sending of the first data conflicts with other transmission).

It should be noted that, the solution in this disclosure may be further applicable to a scenario/system other than the SL. "Over an SL" in step S601 is deleted (that is, a link for sending the first data and/or the first control information is not limited), and the first user equipment and the second user equipment are replaced with a first device and a second device for understanding.

After step S601, the first user equipment may perform any one or more of the following steps S602, S603, and S604.

S602: If the first user equipment does not receive first feedback information, the first user equipment initializes a first counter, or keeps a count value of the first counter unchanged.

Optionally, step S602 may include/be replaced with the following. For a unicast connection, if the first user equipment does not receive first feedback information, the first user equipment initializes a first counter, or keeps a count value of the first counter unchanged.

The first feedback information may indicate whether the second user equipment successfully receives the first data.

The first counter may be used for RLF detection.

It should be noted that the first counter may be the same as or different from a counter (for example, numConsecutiveDTX) used for the RLF detection in an existing protocol. For example, the first counter is numConsecutiveDTX.

Optionally, any one or more of the first data, the first control information, the first feedback information, a first feedback resource, the first counter, first indication information, a PSFCH monitoring occasion, and an RLF are associated with the unicast connection (for example, one unicast connection or a first unicast connection) and/or an RRC connection of the SL (for example, an RRC connection of one SL or an RRC connection of a first SL).

Optionally, it may be understood that the communication method provided in this embodiment of this disclosure may be performed for the unicast connection (for example, one unicast connection), or the communication method provided in this embodiment of this disclosure may be performed for an SL process (for example, all SL processes) associated with the unicast connection.

In this embodiment of this disclosure, "receive" and "received" have different meanings. Further, "receive" means performing a receiving action, and a result of "receive" may be "received" or "not received". "Not receive" means not performing a receiving action, and a result of "not receive" is "not received". That is, "not received" includes two scenarios: One is that the receiving action is performed but fails, and the other is that the receiving action is not performed. Unified descriptions are provided herein and details are not described below again.

Optionally, the first feedback information is transmitted on the first feedback resource. For example, the first feedback resource may be a PSFCH resource.

For example, the first feedback information in this embodiment of this disclosure may be ACK/NACK information.

For example, the first feedback information is an ACK, indicating that the second user equipment successfully receives the first data.

For example, the first feedback information is a NACK, indicating that the second user equipment fails to receive the first data.

Optionally, the first feedback information may also be replaced with a PSFCH in representation.

In a possible implementation, that the first user equipment initializes a first counter includes the following. The first user equipment initializes a count value of the first counter to 0 or a first value. In this implementation, an initial value of the first counter is 0 or a first value, and a count value for triggering the RLF is a preset threshold (for example, a third threshold). It may be understood that the RLF is to be/is triggered when the count value of the first counter reaches (or is greater than or equal to) the preset threshold (for example, the third threshold).

For example, the first value may be an integer. For example, the first value may be 1, or the like. This is not limited in this disclosure.

It should be noted that the third threshold may be the same as or different from a threshold (for example, sl-maxNumConsecutiveDTX) used for the RLF detection in the existing protocol. For example, the third threshold is sl-maxNumConsecutiveDTX.

In another possible implementation, the first user equipment may further initialize the count value of the first counter to the preset threshold (for example, the third threshold). In this implementation, an initial value of the first counter is the preset threshold (for example, the third threshold), and the count value for triggering the RLF is 0 or the first value. It may be understood that the RLF is to be/is triggered when the count value of the first counter reaches (or is less than or equal to) 0 or the first value.

Optionally, that the count value of the first counter is kept unchanged may include/be replaced with the following. The first user equipment determines that the count value of the first counter is unchanged, or the count value of the first counter is kept unchanged.

In the communication method provided in this embodiment of this disclosure, if the first user equipment does not receive the first feedback information, the first user equipment initializes the first counter, or keeps the count value of the first counter unchanged. The first feedback information is not received because the first user equipment does not receive the first feedback information, but not because there is a problem in a radio link (for example, an SL). The first counter does not count a case in which the first feedback information is not received because the first user equipment does not receive the first feedback information, so that the count value of the first counter does not incorrectly/prematurely/quickly reach a count value for triggering an RLF. This reduces a probability of false triggering of the RLF, reduces a communication delay, and improves/ensures communication quality or reliability.

S603: If the first user equipment receives the first feedback information, but the first user equipment fails to receive the first feedback information, the first user equipment increases or decreases the count value of the first counter by 1. In the method, that the first user equipment receives but fails to receive the first feedback information may be that the first user equipment fails to receive the first feedback information because there is a problem in a radio link (for example, an SL). The first counter counts a case in which the first user equipment receives but fails to receive the first feedback information.

Optionally, step S603 may include/be replaced with the following. For a unicast connection, if the first user equipment receives the first feedback information, but the first user equipment fails to receive the first feedback information, the first user equipment increases or decreases the count value of the first counter by 1.

It should be noted that, in a case that the initial value of the first counter is 0 or the first value, and a count value of triggering RLF is the preset threshold (for example, the third threshold), if first user equipment receives the first feedback information, but the first user equipment fails to receive the first feedback information, the first user equipment increases the count value of the first counter by 1.

It should be noted that, in a case that the initial value of the first counter is the preset threshold (for example, the third threshold), and a count value of triggering RLF is 0 or the first value, if the first user equipment receives the first feedback information, but the first user equipment fails to receive the first feedback information, the first user equipment decreases the count value of the first counter by 1.

Compared with the conventional technologies, in this method, a condition constraint on increasing or decreasing the count value of the first counter is added, so that the count value of the first counter does not incorrectly/prematurely/quickly reach a count value for triggering an RLF. This avoids false triggering of the RLF, reduces a communication delay, and improves/ensures communication quality or reliability.

It should be noted that the count value of the first counter may be increased by 1 or decreased by 1. In other words, a granularity/step size of a change of the count value of the first counter may be 1. Alternatively, the count value of the first counter may be increased by a or decreased by a, where a is a positive integer. In other words, a granularity/step size of a change of the count value of the first counter may be a. This is not limited in this disclosure. It may be understood that, that the first user equipment increases or decreases the count value of the first counter by 1 may be replaced with the following. The first user equipment increases or decreases the count value of the first counter by a.

S604: If the first feedback information is received by the first user equipment, the first user equipment initializes the first counter.

Optionally, step S604 may include/be replaced with the following. For a unicast connection, if the first feedback information is received by the first user equipment, the first user equipment initializes the first counter.

Optionally, this disclosure further includes the following. If the count value of the first counter reaches (or greater than or equal to) the third threshold, or the count value of the first counter reaches (or less than or equal to) 0 or the first value, the first user equipment performs any one or more of the following: The first user equipment triggers/detects the RLF. A MAC layer (or a MAC entity, a HARQ entity, or an SL HARQ entity) of the first user equipment indicates, to an upper layer (for example, an RRC layer) of the first user equipment, that the RLF is detected. The first user equipment sends the first indication information to a network device.

Optionally, that the first user equipment triggers/detects the RLF may include/be replaced with the following. The first user equipment determines that the RLF is triggered/detected.

The first indication information indicates that the RLF is detected by the first user equipment, indicates that the RLF occurs, or indicates that a cause for an SL failure is the RLF.

For example, the first indication information indicates the following. For the first unicast connection or the RRC connection of the first SL, the RLF is detected by the first user equipment, the RLF occurs, or a cause for an SL failure is the RLF.

For example, the first indication information may be included in SL user equipment information (SUI). This is not limited in this disclosure.

It may be understood that the first user equipment triggers the RLF, and reports the RLF to the network device, to indicate that a radio link (for example, the SL) is abnormal or a radio link (for example, the SL) fails.

Optionally, this disclosure further includes the following. The unicast connection is established, or the third threshold/the first value is configured or reconfigured, and the first user equipment initializes the first counter.

Optionally, that the first user equipment does not receive the first feedback information includes the following. If reception of the first feedback information conflicts with first transmission, the first user equipment does not receive the first feedback information.

In the method, the first counter used for the RLF detection does not count a case of resource conflict/transmission conflict, so that the first counter can exclude another reason that may cause the first feedback information to be not received by the first user equipment, and count as targeted as possible a quantity of times that the first user equipment fails to receive the first feedback information because there is a problem in a radio link (for example, the SL), so that the count value of the first counter does not incorrectly/prematurely/quickly reach a count value for triggering the RLF. This avoids false triggering of the RLF, reduces a communication delay, and improves/ensures communication quality or reliability.

In this embodiment of this disclosure, the first transmission is another transmission different from the reception of the first feedback information.

The first transmission may include first sending and/or first receiving.

For example, the first transmission may be a PSFCH transmission, a UL transmission, or an LTE SL transmission.

Optionally, that the first user equipment does not receive the first feedback information if reception of the first feedback information conflicts with first transmission includes the following. If the reception of the first feedback information conflicts with the first transmission, and a priority of the reception of the first feedback information is lower than or equal to a priority of the first transmission, the first user equipment does not receive the first feedback information, or the reception of the first feedback information conflicts with the first transmission, and a priority of the reception of the first feedback information is lower than or equal to a priority of the first transmission.

Optionally, that the priority of the reception of the first feedback information is lower than or equal to the priority of the first transmission may be understood/replaced with the following. The reception of the first feedback information is not prioritized.

Optionally, that the priority of the reception of the first feedback information is lower than or equal to the priority of the first transmission may include the following. The first user equipment determines that the priority of the reception of the first feedback information is lower than or equal to the priority of the first transmission.

Optionally, that the reception of the first feedback information is not prioritized may include the following. The first user equipment determines that the reception of the first feedback information is not prioritized.

In the method, if resource conflict/transmission conflict occurs, and the priority of the reception of the first feedback information is low, the first feedback information is not received because the first user equipment performs the first transmission with a high priority, but does not perform the reception of the first feedback information, but not because there is a problem in a radio link. The first counter does not count a case in which the first feedback information is not received because the first user equipment does not receive the first feedback information, so that the count value of the first counter does not incorrectly/prematurely/quickly reach a count value for triggering an RLF. This avoids false triggering of the RLF, reduces a communication delay, and improves/ensures communication quality or reliability.

In this embodiment of this disclosure, for a definition of a priority of reception or transmission and a comparison of the priorities, refer to a part in which the reception of PSFCH conflicts with another transmission/reception in the introduction of the specification. Details are not described herein again.

For example, with reference to FIG. 2, FIG. 7 shows that a communication method provided in the existing protocol and an embodiment of this disclosure is used in an RLF detection process. Initial values of a first counter and a counter in the existing protocol are both 0, and count values for triggering the RLF are both 3. For details about a process of RLF detection in the existing protocol, refer to the content described in FIG. 2. Details are not described herein again. The following describes a process in which the communication method provided in embodiments of this disclosure is used for the RLF detection.

On a first PSFCH monitoring occasion, because reception of the PSFCH conflicts with another transmission and the reception of the PSFCH is not prioritized, transmit end UE does not receive the PSFCH. A count value of the first counter is kept unchanged, and is still an initial value 0.

On a second PSFCH monitoring occasion, the transmit end UE receives the PSFCH but fails to receive the PSFCH. The count value of the first counter is increased by 1, and becomes 1.

On a third PSFCH monitoring occasion, the PSFCH is received by the transmit end UE. The first counter is initialized to 0.

On a fourth PSFCH monitoring occasion, the transmit end UE receives the PSFCH but fails to receive the PSFCH. The count value of the first counter is increased by 1, and becomes 1.

On a fifth PSFCH monitoring occasion, the transmit end UE receives the PSFCH but fails to receive the PSFCH. The count value of the first counter is increased by 1, and becomes 2.

On a sixth PSFCH monitoring occasion, because the reception of the PSFCH conflicts with another transmission and the reception of the PSFCH is not prioritized, the transmit end UE does not receive the PSFCH. The count value of the first counter is kept unchanged, and is still 2.

On a seventh PSFCH monitoring occasion, the PSFCH is received by the transmit end UE. The first counter is initialized to 0.

On an eighth PSFCH monitoring occasion, because the reception of the PSFCH conflicts with another transmission and the reception of the PSFCH is not prioritized, the transmit end UE does not receive the PSFCH. The count value of the first counter is kept unchanged, and is still 0.

On a ninth PSFCH monitoring occasion, because the reception of the PSFCH conflicts with another transmission and the reception of the PSFCH is not prioritized, the transmit end UE does not receive the PSFCH. The count value of the first counter is kept unchanged, and is still 0.

On a tenth PSFCH monitoring occasion, the PSFCH is received by the transmit end UE. The first counter is initialized to 0.

On an eleventh PSFCH monitoring occasion, the PSFCH is received by the transmit end UE. The count value of the first counter is kept unchanged, and is still 0. In other words, the first counter is initialized to 0.

It may be understood that FIG. 7 shows only a PSFCH monitoring occasion associated with the first unicast connection or the RRC connection of the first SL, and reception of the PSFCH associated with another unicast connection or multicast communication is not related to this solution, and is not shown in the figure.

It should be noted that FIG. 7 shows only 11 PSFCH monitoring occasions as an example. Actual PSFCH monitoring occasions may be consecutive or inconsecutive in time domain, and different PSFCH monitoring occasions may alternatively overlap in time domain. This is not limited in this embodiment of this disclosure.

It can be learned from the foregoing analysis that, in comparison with the conventional technologies, the first user equipment in the communication method provided in this embodiment of this disclosure does not falsely trigger an RLF on the sixth PSFCH monitoring occasion, so that a communication delay can be reduced, and communication quality or reliability can be improved/ensured.

In a possible implementation (implementation 1), this disclosure further includes the following. Signal quality between the first user equipment and the second user equipment is greater than or equal to a first threshold, and after performing step S601, the first user equipment performs any one or more of steps S602, S603, and S604.

Optionally, that signal quality between the first user equipment and the second user equipment is greater than or equal to a first threshold may include the following. The first user equipment determines that the signal quality between the first user equipment and the second user equipment is greater than or equal to the first threshold.

It should be noted that a sequence of "the first user equipment determines that the signal quality between the first user equipment and the second user equipment is greater than or equal to the first threshold" and step S601 is not limited in this disclosure.

For example, that signal quality between the first user equipment and the second user equipment is greater than or equal to a first threshold may be understood as that the signal quality between the first user equipment and the second user equipment is good.

It may be understood that, when the signal quality is good, it indicates that the radio link is normal, and the first counter used for RLF detection does not count a case in which the first feedback information is not received because the first user equipment does not receive the first feedback information. This avoids false triggering of an RLF, reduces a communication delay, and improves/ensures communication quality or reliability.

Figure 6B:
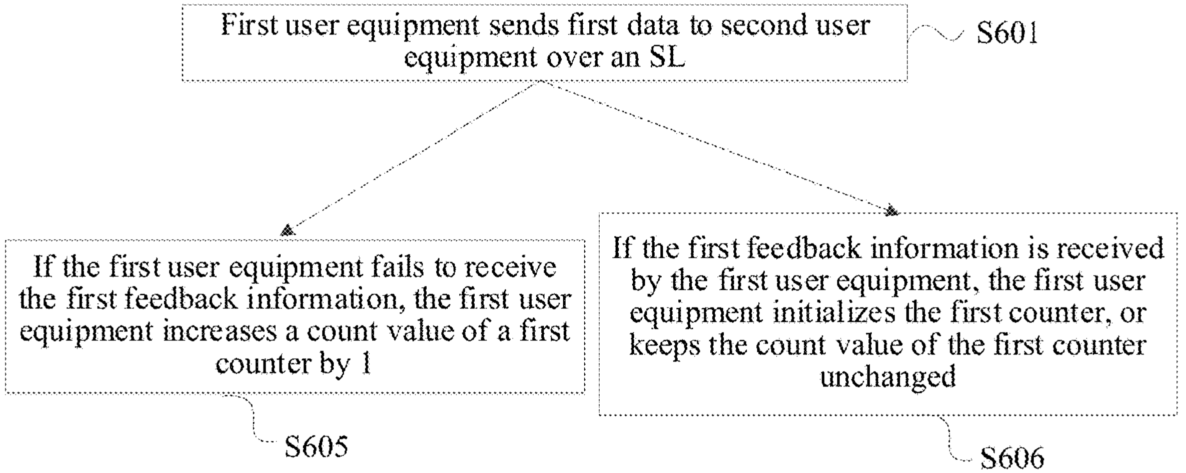
FIG. 6B is a flowchart of another communication method according to an embodiment of this disclosure.

In this embodiment of this disclosure, the signal quality between the first user equipment and the second user equipment may be determined based on reference signal received power (RSRP), reference signal received quality (RSRQ), channel state information (CSI), SL-CSI, a sounding reference signal (SRS), or the like. This is not limited in this disclosure. In another possible implementation (implementation 2), this disclosure further includes the following. Signal quality between the first user equipment and the second user equipment is less than or equal to a second threshold. As shown in FIG. 6B, after performing step S601, the first user equipment performs step S605 and/or step S606.

Optionally, that signal quality between the first user equipment and the second user equipment is less than or equal to a second threshold may include the following. The first user equipment determines that the signal quality between the first user equipment and the second user equipment is less than or equal to the second threshold.

It should be noted that a sequence of "the first user equipment determines that the signal quality between the first user equipment and the second user equipment is less than or equal to the second threshold" and step S601 is not limited in this disclosure.

For example, that signal quality between the first user equipment and the second user equipment is less than or equal to a second threshold may be understood as that the signal quality between the first user equipment and the second user equipment is poor.

S605: If the first user equipment fails to receive the first feedback information, the first user equipment increases a count value of a first counter by 1.

Optionally, step S605 may include/be replaced with the following. For a unicast connection, if the first user equipment fails to receive the first feedback information, the first user equipment increases the count value of the first counter by 1.

That the first user equipment fails to receive the first feedback information includes the following. The first user equipment does not receive the first feedback information, and/or the first user equipment receives the first feedback information, but the first user equipment fails to receive the first feedback information.

S606: If the first feedback information is received by the first user equipment, the first user equipment initializes the first counter, or keeps the count value of the first counter unchanged.

Optionally, step S606 may include/be replaced with the following. For a unicast connection, if the first feedback information is received by the first user equipment, the first user equipment initializes the first counter, or keeps the count value of the first counter unchanged.

It may be understood that, when the signal quality is poor, it indicates that an exception may exist in the radio link. In this case, the first counter used for RLF detection counts a case in which the first feedback information is not received because the first user equipment does not receive the first feedback information, so that the RLF can be triggered more quickly, and further, the unicast connection can be restored/re-established as soon as possible, to reduce a communication delay.

It should be noted that the first threshold and the second threshold may be the same or may be different. This is not limited in this disclosure.

It should be noted that the implementation 1 and the implementation 2 may be separately used as separate embodiments (or the implementation 2 may not depend on the implementation 1, or the implementation 2 does not depend on steps S602, S603, and S604), or the implementation 1 and the implementation 2 may be combined with each other (or any one or more of steps S602, S603, and S604 may be combined with step S605 and/or S606). This is not limited in the present disclosure.

Figure 8:
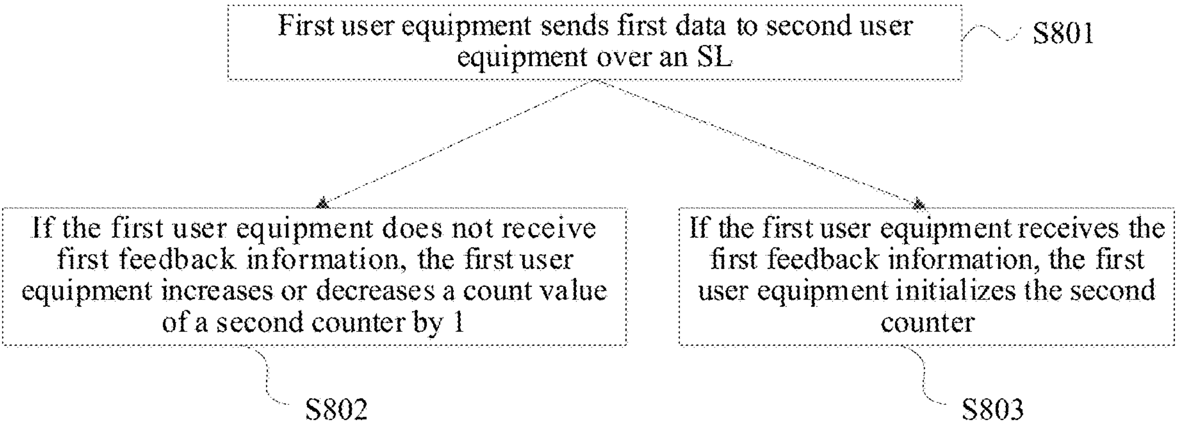
FIG. 8 is a flowchart of still another communication method according to an embodiment of this disclosure.

FIG. 8 shows another communication method according to an embodiment of this disclosure. The communication method includes the following steps.

S801: First user equipment sends first data to second user equipment over an SL.

For descriptions of step S801, refer to related descriptions of step S601. Details are not described herein again.

After step S801, the first user equipment may perform step S802 and/or S803.

S802: If the first user equipment does not receive first feedback information, the first user equipment increases or decreases a count value of a second counter by 1.

The first feedback information indicates whether the second user equipment successfully receives the first data.

For content related to the first feedback information, refer to related descriptions in the embodiment in FIG. 6A and FIG. 6B. Details are not described herein again.

The second counter is configured to count a quantity of times that feedback information is not received by the first user equipment consecutively.

Optionally, step 802 may include/be replaced with the following. For a unicast connection, if the first user equipment does not receive first feedback information, the first user equipment increases or decreases a count value of a second counter by 1.

Optionally, any one or more of the first data, first control information, the first feedback information, a first feedback resource, feedback information, the second counter, second indication information, third indication information, and a PSFCH monitoring occasion are associated with the unicast connection (for example, one unicast connection or a first unicast connection) and/or an RRC connection of the SL (for example, an RRC connection of one SL or an RRC connection of a first SL).

Optionally, it may be understood that the communication method provided in this embodiment of this disclosure may be performed for the unicast connection (for example, one unicast connection), or the communication method provided in this embodiment of this disclosure may be performed for an SL process (for example, all SL processes) associated with the unicast connection.

It should be noted that the count value of the second counter may be increased by 1 or decreased by 1. In other words, a granularity/step size of a change of the count value of the second counter may be 1. Alternatively, the count value of the second counter may also be increased by b or decreased by b, where b is a positive integer. In other words, a granularity/step size of a change of the count value of the second counter may be b. This is not limited in this disclosure. It may be understood that, that the first user equipment increases or decreases the count value of the second counter by 1 may be replaced with the following. The first user equipment increases or decreases the count value of the second counter by b.

It should be noted that the second counter may be used independently, or the second counter may be used together with the first counter provided in this embodiment of this disclosure. Alternatively, the second counter may be used together with the counter in the existing protocol shown in FIG. 2. This is not limited in this disclosure.

S803: If the first user equipment receives the first feedback information, the first user equipment initializes the second counter.

Optionally, step 803 may include/be replaced with the following. For a unicast connection, if the first user equipment receives the first feedback information, the first user equipment initializes the second counter.

In a possible implementation, that the first user equipment initializes the second counter includes the following. The first user equipment initializes the count value of the second counter to 0 or a second value. In this implementation, an initial value of the second counter is 0 or the second value, and a count value of any one or more of triggering the RLF, triggering sending of the second indication information and/or the third indication information, and triggering resource reselection is a preset threshold (for example, a fourth threshold). It may be understood that, if the count value of the second counter reaches (or is greater than or equal to) the preset threshold (for example, the fourth threshold), any one or more of an RLF, sending of the second indication information and/or the third indication information, and the resource reselection are to be triggered.

For example, the second value may be an integer. For example, the second value may be 1, or the like. This is not limited in this disclosure.

For example, the resource reselection may include SL resource reselection.

In another possible implementation, the first user equipment may further initialize the count value of the second counter to the preset threshold (for example, the fourth threshold). In this implementation, an initial value of the second counter is the preset threshold (for example, the fourth threshold), and a count value of any one or more of triggering the RLF, triggering sending of the second indication information and/or the third indication information, and triggering resource reselection is 0 or a second value. It may be understood that, if the count value of the second counter reaches (or is less than or equal to) 0 or the second value, any one or more of an RLF, sending of the second indication information and/or the third indication information, and resource reselection are to be triggered.

It should be noted that, in a case that the initial value of the second counter is 0 or the second value, and any one or more count values of triggering the RLF, triggering sending of the second indication information and/or the third indication information, and triggering resource reselection are the preset threshold (for example, the fourth threshold), if the first user equipment receives the first feedback information, but the first user equipment fails to receive the first feedback information, the first user equipment increases the count value of the second counter by 1.

It should be noted that, in a case that an initial value of the second counter is a preset threshold (for example, a fourth threshold), and any one or more count values of triggering the RLF, triggering sending of the second indication information and/or the third indication information, and triggering the resource reselection are 0 or the second value, if the first user equipment receives the first feedback information, but the first user equipment fails to receive the first feedback information, the first user equipment decreases the count value of the second counter by 1.

Optionally, this disclosure further includes the following. The unicast connection is established, or the fourth threshold/second value is configured or reconfigured, and the first user equipment initializes the second counter.

Optionally, this disclosure further includes the following. If the count value of the second counter reaches (or greater than or equal to) the fourth threshold, or the count value of the second counter reaches (or less than or equal to) 0 or the second value, the first user equipment performs any one or more of the following. The first user equipment triggers/detects the RLF. A MAC layer (or a MAC entity, a HARQ entity, or an SL HARQ entity) of the first user equipment indicates, to an upper layer (for example, an RRC layer) of the first user equipment, that the RLF is detected. The first user equipment sends the second indication information and/or the third indication information to a network device. Alternatively, the first user equipment triggers the resource reselection.

Optionally, that the first user equipment triggers/detects the RLF may include/be replaced with the following. The first user equipment determines that the RLF is triggered/detected.

The second indication information indicates that the RLF is detected by the first user equipment, indicates that the RLF occurs, or indicates that a cause for an SL failure is the RLF.

The third indication information indicates that the count value of the second counter reaches (or greater than or equal to) the fourth threshold, or the count value of the second counter reaches (or less than or equal to) 0 or the second value, indicates that a quantity of times that feedback information is not received by the first user equipment consecutively reaches the preset threshold (for example, the fourth threshold), or indicates that a quantity of times that the reception of the feedback information continuously conflicts with another transmission reaches the preset threshold (for example, the fourth threshold).

For example, the second indication information indicates the following. For the first unicast connection or the RRC connection of the first SL, the RLF is detected by the first user equipment, the RLF occurs, or a cause for an SL failure is the RLF.

For example, the third indication information indicates the following. For the first unicast connection or the RRC connection of the first SL, the count value of the second counter reaches (or greater than or equal to) the fourth threshold, or the count value of the second counter reaches (or less than or equal to) 0 or the second value, a quantity of times that feedback information is not received by the first user equipment consecutively reaches the preset threshold (for example, the fourth threshold), or a quantity of times that the reception of the feedback information continuously conflicts with another transmission reaches the preset threshold (for example, the fourth threshold).

It should be noted that the second indication information may be the same as or different from the first indication information. This is not limited in this disclosure.

Optionally, the second indication information may further indicate a reason for triggering/detecting the RLF. For example, the reason may include that a quantity of times that feedback information is not received by the first user equipment consecutively reaches the preset threshold (for example, the fourth threshold), a quantity of times that reception of the feedback information continuously conflicts with another transmission reaches the preset threshold (for example, the fourth threshold), the count value of the second counter reaches (or is greater than or equal to) the fourth threshold, or the count value of the second counter reaches (or is less than or equal to) 0 or the second value.

For example, the second indication information and/or the third indication information may be included in SUI. This is not limited in this disclosure.

In another communication method provided in this embodiment of this disclosure, the first user equipment may report the second indication information (for example, a reason for triggering/detecting the RLF) and/or the third indication information to the network device, and indicate, to the network, that a probability of current resource conflict/transmission conflict is high (or indicate, to a network, that a quantity of current resource conflict/transmission conflict reaches a specific threshold), so that the network device can correspondingly adjust some parameters, thereby reducing a probability of resource conflict/transmission conflict, improving communication quality, reducing a communication delay, and ensuring communication reliability.

In another communication method provided in this embodiment of this disclosure, if the RLF is triggered/detected by the first user equipment, the first user equipment may use a corresponding policy, for example, restoring the unicast connection or re-establishing the unicast connection, thereby improving communication quality, reducing a communication delay, and ensuring communication reliability.

In another communication method provided in this embodiment of this disclosure, the first user equipment triggers the resource reselection, so that the first user equipment can reselect a resource, thereby reducing a probability of resource conflict/transmission conflict, improving communication quality, reducing a communication delay, and ensuring communication reliability.

It should be noted that, in this disclosure, different embodiments may be combined with each other, some content/steps in different embodiments are combined with each other, or all content in different embodiments is combined with each other.

It should be noted that, in this disclosure, a same term/content is not repeatedly explained in different embodiments for ease of use. Unless otherwise specified, the same term/content may be used in different embodiments.

Because the first user equipment in the foregoing embodiment may use the architecture of the communication apparatus 40 shown in FIG. 4, the actions of the first user equipment in the foregoing embodiment may be performed by the processor 401 in the communication apparatus 40 shown in FIG. 4 by calling the application program code stored in the memory 403, to indicate the first user equipment to execute the actions. This is not limited in this embodiment.

Alternatively, the actions of the first user equipment in the foregoing steps S601 and S602 and steps S801 and S802 may be executed by the processor 510 in the mobile terminal 50 shown in FIG. 5 by calling the application program code stored in a memory (including an internal memory 521 or an external memory connected to the external memory interface 520), to instruct the mobile terminal to execute the actions. This is not limited in this embodiment.

It may be understood that, in the foregoing embodiments, the methods and/or steps implemented by the first user equipment may also be implemented by a component (for example, a chip or a circuit) that may be used in the first user equipment.

The foregoing mainly describes the solutions provided in embodiments of this disclosure from a perspective of the first user equipment. Correspondingly, an embodiment of this disclosure further provides a communication apparatus, and the communication apparatus is configured to implement the foregoing methods. The communication apparatus may be the first user equipment in the foregoing method embodiments, or an apparatus including the foregoing first user equipment, or a component that can be used in the first user equipment. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In embodiments of this disclosure, the communication apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software functional module. It should be noted that, in embodiments of this disclosure, module division is an example, and is merely a logical function division. In actual implementation, another division manner may be used.

Figure 9:
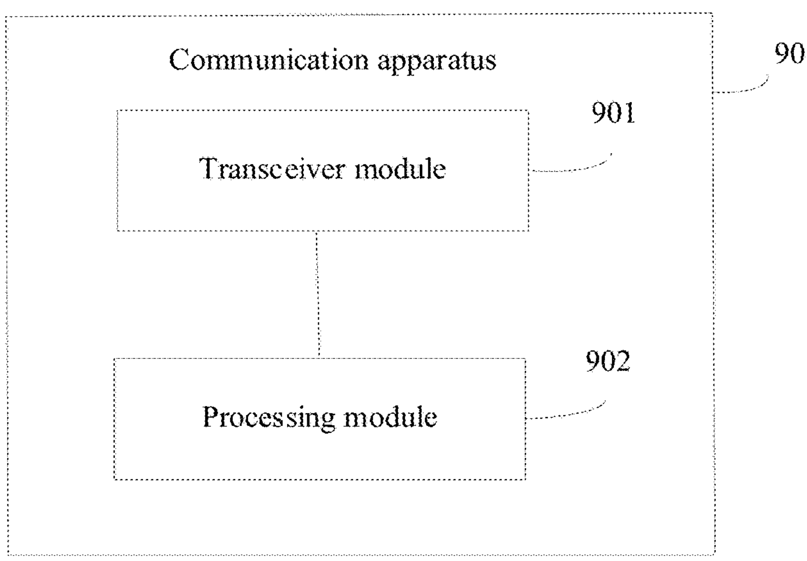
FIG. 9 is a schematic diagram of a structure of another communication apparatus according to an embodiment of this disclosure.

FIG. 9 is a schematic diagram of a structure of a communication apparatus 90. The communication apparatus 90 includes a transceiver module 901 and a processing module 902. The transceiver module 901 may also be referred to as a transceiver unit, and is configured to implement a transceiver function. For example, the transceiver module 901 may be a transceiver circuit, a transceiver unit, a transceiver apparatus, or a communication interface.

For example, the communication apparatus 90 is the first user equipment in the foregoing method embodiment. In this case, the transceiver module 901 is configured to send first data to second user equipment over an SL. The processing module 902 is configured to, if the first feedback information is not received, initialize a first counter, or keep a count value of the first counter unchanged. The first feedback information indicates whether the second user equipment successfully receives the first data. The first counter is used for RLF detection.

In a possible implementation, the transceiver module 901 is further configured to receive the first feedback information. The processing module 902 is further configured to, if the first feedback information fails to be received, increase the count value of the first counter by 1.

In a possible implementation, that the first feedback information fails to be received includes the following. If reception of the first feedback information conflicts with first transmission, the first feedback information is not received.

In a possible implementation, that the first feedback information is not received includes the following. If the reception of the first feedback information conflicts with the first transmission, and a priority of the reception of the first feedback information is lower than or equal to a priority of the first transmission, the first feedback information is not received.

In a possible implementation, that the processing module 902 is configured to initialize a first counter includes the following. The processing module 902 is configured to initialize the count value of the first counter to 0.

In a possible implementation, the processing module 902 is further configured to, if signal quality between the first user equipment and the second user equipment is less than or equal to a second threshold, and the first feedback information fails to be received, increase the count value of the first counter by 1.

In a possible implementation, the transceiver module 901 is further configured to, if the count value of the first counter is greater than or equal to a third threshold, send first indication information to a network device, where the first indication information indicates that an RLF is detected by the first user equipment.

All related content of the steps in the foregoing method embodiments may be cited in function descriptions of the corresponding functional modules. Details are not described herein again.

In this embodiment, the communication apparatus 90 is presented in a form of functional modules obtained through division in the integrated manner. The module herein may be an ASIC, a circuit, a processor that executes one or more software or firmware programs, a memory, an integrated logic circuit, and/or another component capable of providing the foregoing functions.

When the communication apparatus 90 is the first user equipment in the foregoing method embodiment, in a simple embodiment, a person skilled in the art may figure out that the communication apparatus 90 may be in a form shown in FIG. 4.

For example, the processor 401 or 407 in the first user equipment shown in FIG. 4 may call the computer executable instruction stored in the memory 403, so that the first user equipment performs the communication method in the foregoing method embodiment. Further, functions/implementation processes of the transceiver module 901 and the processing module 902 in FIG. 9 may be implemented by the processor 401 or 407 in the first user equipment shown in FIG. 4 by calling the computer executable instruction stored in the memory. Alternatively, a function/implementation process of the processing module 902 in FIG. 9 may be implemented by the processor 401 or 407 in the first user equipment shown in FIG. 4 by calling the computer executable instruction stored in the memory, and a function/implementation process of the transceiver module 901 in FIG. 9 may be implemented by the communication interface 404 shown in FIG. 4.

Alternatively, when the communication apparatus 90 is the first user equipment in the foregoing method embodiment, and the first user equipment is a mobile terminal, in a simple embodiment, a person skilled in the art may figure out that the communication apparatus 90 may be in a form of the mobile terminal 50 shown in FIG. 5.

For example, the processor 510 in the mobile terminal 50 shown in FIG. 5 may call a computer executable instruction stored in a memory (including the internal memory 521 or the external memory connected to the external memory interface 520), so that the mobile terminal 50 performs the communication method in the foregoing method embodiment. Further, functions/implementation processes of the transceiver module 901 and the processing module 902 in FIG. 9 may be implemented by the processor 510 in the mobile terminal 50 shown in FIG. 5 by calling the computer executable instruction stored in the memory. Alternatively, a function/implementation process of the processing module 902 in FIG. 9 may be implemented by the processor 510 in the mobile terminal 50 shown in FIG. 5 by calling the computer executable instruction stored in the memory, and a function/implementation process of the transceiver module 901 in FIG. 9 may be implemented by the wireless communication module 550 shown in FIG. 5.

The communication apparatus 90 provided in this embodiment can perform the foregoing communication method. Therefore, for technical effects that can be achieved by the communication apparatus 90, refer to the foregoing method embodiments. Details are not described herein again.

It should be noted that one or more of the foregoing modules or units may be implemented by software, hardware, or a combination thereof. When any one of the foregoing modules or units is implemented by software, the software exists in a form of a computer program instruction, and is stored in the memory. The processor may be configured to execute the program instruction and implement the foregoing method procedure. The processor may be built into a system-on-a-chip (SoC) or an ASIC, or may be an independent semiconductor chip. In addition to cores configured to execute software instructions to perform operations or processing, the processor may further include a necessary hardware accelerator, such as a field-programmable gate array (FPGA), a programmable logic device (PLD), or a logic circuit implementing a dedicated logical operation.

When the foregoing modules or units are implemented by using hardware, the hardware may be any one or any combination of a CPU, a microprocessor, a digital signal processing (DSP) chip, a microcontroller unit (MCU), an artificial intelligence processor, the ASIC, the SoC, the FPGA, the PLD, a dedicated digital circuit, a hardware accelerator, or a non-integrated discrete device, and the hardware may run necessary software or does not depend on software to perform the foregoing method procedures.

Optionally, an embodiment of this disclosure further provides a chip system. The chip system includes at least one processor and an interface. The at least one processor is coupled to a memory through the interface. When the at least one processor executes a computer program or instructions in the memory, the method according to any one of the foregoing method embodiments is performed. In a possible implementation, the communication apparatus further includes a memory. Optionally, the chip system may include a chip, or may include a chip and another discrete component. This is not limited in embodiments of this disclosure.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedures or functions according to embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this disclosure is described with reference to embodiments, in a process of implementing this disclosure that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this disclosure is described with reference to specific features and embodiments thereof, it is clear that various modifications and combinations may be made to them without departing from the spirit and scope of this disclosure. Correspondingly, the specification and accompanying drawings are merely example description of this disclosure defined by the appended claims, and are considered as any of or all modifications, variations, combinations or equivalents that cover the scope of this disclosure. It is clearly that a person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. A method implemented by a first user equipment, wherein the method comprises:

sending data to a second user equipment over a sidelink (SL); and initializing a counter or keeping a count value of the counter unchanged when the first user equipment does not receive feedback information, wherein the feedback information indicates whether the second user equipment successfully receives the data, wherein the first user equipment keeps the count value unchanged when reception of the feedback information conflicts with transmission of the data and when a first priority of the reception of the feedback information is lower than or equal to a second priority of the transmission, and wherein the counter is for radio link failure (RLF) detection.

2. The method of claim 1, further comprising:

making an identification that the first user equipment receives the feedback information and the first user equipment fails to receive the feedback information; and increasing, in response to the identification, the count value by 1.

3. The method of claim 1, wherein initializing the counter comprises initializing the count value to 0.

4. The method of claim 1, wherein a signal quality between the first user equipment and the second user equipment is greater than or equal to a threshold.

5. The method of claim 1, further comprising:

making an identification that a signal quality between the first user equipment and the second user equipment is less than or equal to a threshold and the first user equipment fails to receive the feedback information; and increasing, in response to the identification, the count value by 1.

6. The method of claim 1, further comprising transmitting the feedback information on a physical sidelink feedback channel (PSFCH).

7. The method of claim 1, further comprising:

making an identification that the count value is greater than or equal to a threshold; and sending, to a network device and in response to the identification, indication information indicating that the first user equipment has detected the RLF.

8. A first user equipment, comprising:

a memory configured to store instructions; and at least one processor coupled to the memory and configured to execute the instructions to cause the first user equipment to:

send data to a second user equipment over a sidelink (SL); and initialize a counter or keep a count value of the counter unchanged when feedback information is not received, wherein the feedback information indicates whether the second user equipment successfully receives the data, wherein the first user equipment keeps the count value unchanged when reception of the feedback information conflicts with transmission of the data and when a first priority of the reception of the feedback information is lower than or equal to a second priority of the transmission, and wherein the counter is for radio link failure (RLF) detection.

9. The first user equipment of claim 8, wherein the at least one processor is further configured to execute the instructions to cause the first user equipment to:

receive the feedback information and fail to obtain the feedback information; and increase, in response to receiving the feedback information and failing to obtain the feedback information, the count value by 1.

10. The first user equipment of claim 8, wherein the at least one processor is further configured to execute the instructions to cause the first user equipment to initialize the count value to 0.

11. The first user equipment of claim 8, wherein a signal quality between the first user equipment and the second user equipment is greater than or equal to a threshold.

12. The first user equipment of claim 8, wherein the at least one processor is further configured to execute the instructions to cause the first user equipment to:

make an identification that a signal quality between the first user equipment and the second user equipment is less than or equal to a threshold and the feedback information fails to be received; and increase, in response to the identification, the count value by 1.

13. The first user equipment of claim 8, wherein the at least one processor is further configured to execute the instructions to cause the first user equipment to transmit the feedback information on a physical sidelink feedback channel (PSFCH).

14. The first user equipment of claim 8, wherein the at least one processor is further configured to execute the instructions to cause the first user equipment to:

make an identification that the count value is greater than or equal to a threshold; and send, to a network device and in response to the identification, indication information indicating that the first user equipment has detected the RLF.

15. A non-transitory computer-readable medium comprising computer-executable instructions that, when executed by at least one processor, cause a first user equipment to:

send data to a second user equipment over a sidelink (SL); and initialize a counter or keep a count value of the counter unchanged when feedback information is not received, wherein the feedback information indicates whether the second user equipment successfully receives the data, wherein the first user equipment keeps the count value unchanged when reception of the feedback information conflicts with transmission of the data and when a first priority of the reception of the feedback information is lower than or equal to a second priority of the transmission, and wherein the counter is for radio link failure (RLF) detection.

16. The non-transitory computer-readable medium of claim 15, wherein the computer-executable instructions further cause the first user equipment to:

receive the feedback information and fail to obtain the feedback information; and increase, in response to receiving the feedback information and failing to obtain the feedback information, the count value by 1.

17. The non-transitory computer-readable medium of claim 16, wherein the computer-executable instructions further cause the first user equipment to receive the feedback information and fail to obtain the feedback information when a radio link between the first user equipment and the second user equipment is abnormal.

18. The non-transitory computer-readable medium of claim 15, wherein the computer-executable instructions further cause the first user equipment to trigger the RLF when the count value of the first counter is greater than or equal to a threshold.

19. The non-transitory computer-readable medium of claim 15, wherein the computer-executable instructions further cause the first user equipment to keep the count value unchanged when a signal quality between the first user equipment and the second user equipment is greater than or equal to a first threshold.

20. The non-transitory computer-readable medium of claim 19, wherein the computer-executable instructions further cause the first user equipment to increase the count value by 1 when the signal quality is less than a second threshold and the first user equipment fails to successfully receive the first feedback information.

* * * * *